(12) United States Patent
Rosman et al.

(10) Patent No.: US 8,645,440 B2
(45) Date of Patent: Feb. 4, 2014

(54) ACCELERATION OF MULTIDIMENSIONAL SCALING BY VECTOR EXTRAPOLATION TECHNIQUES

(76) Inventors: Guy Rosman, Haifa (IL); Alexander Bronstein, San Jose, CA (US); Michael Bronstein, Santa Clara, CA (US); Ron Kimmel, Haifa (IL)

(*) Notice: Subject to any disclaimer, the term of this patent is extended or adjusted under 35 U.S.C. 154(b) by 1385 days.

(21) Appl. No.: 12/155,827

(22) Filed: Jun. 10, 2008

(65) Prior Publication Data

US 2009/0037507 A1 Feb. 5, 2009

Related U.S. Application Data

(60) Provisional application No. 60/943,081, filed on Jun. 11, 2007.

(51) Int. Cl.
*G06F 7/00* (2006.01)
*G06F 7/32* (2006.01)

(52) U.S. Cl.
USPC .......................................... 708/208; 708/520

(58) Field of Classification Search
USPC ........................................ 708/200, 520, 208
See application file for complete search history.

(56) References Cited

U.S. PATENT DOCUMENTS

| 6,453,246 B1 * | 9/2002 | Agrafiotis et al. ............... 702/27 |
| 2002/0069043 A1 * | 6/2002 | Agrafiotis et al. ............... 703/22 |
| 2006/0112098 A1 * | 5/2006 | Renshaw et al. .................. 707/7 |

OTHER PUBLICATIONS

Rosman et al. "Manifold Analysis by Topologically Constrained Isometric Embedding", Word Academy of Science, Engineering and Technology, 2006, pp. 122-128.*
Yang et al. "A Fast Approximation to Multidimensional Scaling", Workshop on Computation Intensive Methods for Computer Vision, 2006, pp. 99-106.*
Taguchi, Yoshihiro, et al., "Relational patterns of gene expression via non-metric multidimensional scaling analysis," Bioinformatics, vol. 21(6), 2005, pp. 730-740(11).
Torgerson, Warren S., et al., "Multidimensional scaling: I. Theory and Method," P.Sym., vol. 17, 1952, pp. 401-419.
Tsumoto, S., et al., "Visualization of rule's similarity using multidimensional scaling," ICDM, Nov. 2003, pp. 339-346.
Wang, Jason Tsong-Li, et al., "Evaluating a class of distance-mapping algorithms for data mining and clustering," KDD '99: Proceedings of the 5th ACM SIGKDD International Conference on Knowledge Discovery and Data Mining, ACM Press, 1999, pp. 307-311.

(Continued)

*Primary Examiner* — Chuong D Ngo

(57) ABSTRACT

A method for multidimensional scaling (MDS) of a data set comprising a plurality of data elements is provided, wherein each data element is identified by its coordinates, the method comprising the steps of: (i) applying an iterative optimization technique, such as SMACOF, a predetermined amount of times on a coordinates vector, said coordinates vector representing the coordinates of a plurality of said data elements, and obtaining a modified coordinates vector; (ii) applying a vector extrapolation technique, such as Minimal Polynomial Extrapolation (MPE) or reduced Rank Extrapolation (RRE) on said modified coordinates vector obtaining a further modified coordinates vector; and (iii) repeating steps (i) and (ii) until one or more predefined conditions are met.

10 Claims, 15 Drawing Sheets
(14 of 15 Drawing Sheet(s) Filed in Color)

(56) References Cited

OTHER PUBLICATIONS

Weinberger, K. Q., et al., "Unsupervised learning of image manifolds by semidefinite programming," IEEE Conference on Computer Vision and Pattern Recognition—IEEE Computer Society, vol. 2, 2004, pp. 988-995.
Yang, Tynia, et al., "A fast approximation to multidimensional scaling," IEEE workshop on Computation Intensitve Methods for Computer Vision, 2006.
Zhang, Zhenyue, et al., "Principal manifolds and nonlinear dimensionality reduction via tangent space alignment," SIAM Journal on scientific computing, vol. 23(3), 2005.
Zigelman, Gil, et al., "Texture mapping using surface flattening via multidimensional scaling," IEEE Trans. Visualization and Computer Graphics, vol. 8(2), 2002, pp. 198-207.
Arnoldi, Walter E., "The principle of minimized iterations in the solutions of the matrix eigenvalue problem", Quart. Appl. Math., vol. 9, 1951, pp. 17-29.
Bartell, Brian T., et al., "Latent semantic indexing is an optimal special case of multidimensional scaling," SIGIR-Proceedings of the 15th Annual international ACM SIGIR conference on Research and development in information retrieval—ACM Press, 1992, pp. 161-167.
Belkin, M., et al., "Laplacian eigenmaps and spectral techniques for embedding and clustering," Advances in Neural Information Processing Systems-MIT Press, vol. 14, 2002, pp. 585-591.
Bernstein, M., et al., "Graph approximations to geodesics on embedded manifolds," Technical Report-Stanford Univ., Jan. 2001.
Boisvert, Ronald F., et al., "The Matrix Market: a web resource for test matrix collections", Quality of Numerical Software, Assessment and Enhancement, 1997, pp. 125-137.
Boult, T.E., et al., "Visual surface reconstruction using sparse depth data," Computer Vision and Pattern Recognition, vol. 86, 1986, pp. 68-76.
Brandes, Ulrik, et al., "Eigensolver methods for progressive multidimensional scaling of large data," Graph drawing, Karlsruhe, Germany. Sep. 18-20, 2006, 2007, pp. 42-53.
Bronstein, Alex M., et al., "Expression-invariant face recognition via spherical embedding," In Proc. IEEE International Conf Image Processing (ICIP), 2005.
Bronstein, a.M., et al., "Generalized multidimensional scaling: a framework for isometry-invariant partial surface matching," Proceedings of the National Academy of Sciences, vol. 103(5), Jan. 2006, pp. 1168-1172.
Bronstein, M.M., et al., "Three-dimensional face recognition," International Journal of Computer Vision, 64(1), Aug. 2005, pp. 5-30.
Bronstein, Michael M., et al., "Multigrid multidimensional scaling," Numerical Linear Algebra with Applications, vol. 13(2-3), Mar.-Apr. 2006, pp. 149-171.
Brun, Anders, et al., "Coloring of DT-MRI Fiber Traces using Laplacian Eigenmaps", Springer-Verlag, Feb. 2003.
Cabay, Stan, et al., "A polynomial extrapolation method for finding limits and antilimits of vector sequences," SIAM Jour. Numer. Anal., vol. 13(5), 1976, pp. 734-752.
Chalmers, Matthew, "A linear iteration time layout algorithm for visualizing high-dimensional data," In IEEE Visualization, 1996, pp. 127-132.
Cheung, Ka W., et al., "A multidimensional scaling framework for mobile location using time-of-arrival measurements," IEEE Transactions of Signal Processing, vol. 53(2), 2005, pp. 460-470.
Coifman, R. R., et al., "Geometric diffusions as a tool for harmonic analysis and structure definition of data," Proceedings of the National Academy of Sciences, vol. 102(21), May 2005, pp. 7426-7431.
Das, P, et al., "Low-dimensional, free-energy landscapes of protein-folding reactions by nonlineardimensionality reduction," Proc. Natl. Acad. Sci, USA, vol. 103(26), 2006, pp. 9885-9890.
de Silva, Vin, et al., "Global versus local methods in nonlinear dimensionality reduction," MIT Press, 2002, pp. 705-712.
Duda, R.O., et al., "Pattern Classification and Scene Analysis," Wiley-Interscience, 2nd Edition, 2000.

Elad, Asi, et al., "On bending invariant signatures for surfaces," IEEE Trans. Pattern Anal. Mach. Intell., vol. 25(10), 2003, pp. 1285-1295.
Eldar, Y., et al., "The farthest point strategy for progressive image sampling," IEEE Transactions on Image Processing, vol. 6(9), Sep. 1997, pp. 1305-1315.
Faloutsos, Christos, et al., "FastMap: A fast algorithm for indexing, data-mining and visualization of traditional and multimedia datasets," Proceedings of the 1995 ACM SIGMOD International conference on Management of Data, 1995, pp. 163-174.
Fisher, Ronald A. "The systematic location of genes by means of crossover observations," The American Naturalist, vol. 56, 1922, pp. 406-411.
Freedman, D., "Efficient simplicial reconstructions of manifolds from their samples," IEEE Transactions on Pattern Analysis and Machine Intelligence, vol. 24(10), Oct. 2002, pp. 1349-1357.
Gansner, Emden R., et al., "Graph drawing by stress majorization," J'anos Pach, Graph Drawing, Computer Science (Springer), vol. 3383, 2004, pp. 239-250.
Grimes, C., et al., "Hessian eigenmaps: Locally linear embedding techniques for high-dimensional data," Proceedings of the National Academy of Sciences, vol. 100(10), May 2003, pp. 5591-5596.
Grimes, C., et al., "When does isomap recover the natural parameterization of families of articulates images?", Technical Report, vol. 27, 2007.
Guttman, Louis, "A general nonmetric technique for finding the smallest coordinate space for a configuration of points," Psychometrika, vol. 33, 1968, pp. 469-506.
Guy, G., et al., "Inference of surfaces, 3D curves, and junctions from sparse, noisy, 3D data," IEEE Transactions on Pattern Analysis and Machine Intelligence, vol. 19(11), Nov. 1997, pp. 1265-1277.
Kearsley, Anthony, et al., "The solution of the metric stress and stress problems in multidimensional scaling using Newton's method," Computationial Statistics, vol. 13(3), 1998, pp. 369-396.
Kimmel, R., et al., "Computing geodesic paths on manifolds," Proceedings of the National Academy of Sciences, Vo. 95(15), Jul. 1998, pp. 8431-8435.
Kruskal, Joseph B., "Mutidimensional scaling by optimizing goodness of fit to a nonmetric hypothesis," vol. 29, 1964, pp. 1-27.
Mar-Molinero, Cecilio, et al., "Bank Failure: a multidimensional scaling approach," The European Journal of Finance, vol. 7, No. 2, 2001.
Mordohai, P., et al., "Unsupervised dimensionality estimation and manifold learning in high-dimensional spaces by tensor voting," Proceedings of International Joint Conference on Artificial Intelligence, 2005, pp. 798-803.
Morrison, Alistair, et al., "Fast multidimensional scaling through sampling, springs, and interpolation," Information Visualization, vol. 2(1), 2003, pp. 68-77.
Pless, Robert, "Using Isomap to explore video sequences," Proceedings of the 9th International Conference on Computer Vision, Oct. 2003, pp. 1433-1440.
Poole, Keith T., "Nonparametric unfolding of binary choice data," Political Analysis, vol. 8(3), 2000, pp. 211-237.
Rosman, G., et al., "Topologically constrained isometric embedding," Proc. Conf. on Machine Learning and Pattern Recognition, 2006.
Roweis, S.T., et al., "Nonlinear dimensionality reduction by locally linear embedding," Science, vol. 290, 2000, pp. 2323-2326.
Saad, Yousef, et al., "A generalized minimal residual method for solving nonsymmetric linear systems," SIAM J. Sc. Statis. Comput., vol. 7, 1986, pp. 856-869.
Schwartz, Eric L., et al., "A numerical solution to the generalized mapmaker's problem: Flattening nonconvex polyhedral surfaces," IEEE Trans. Pattern Analysis Machine Intelligence, vol. 11, Nov. 1989, pp. 1005-1008.
Sidi, Avram, "Efficient implementation of minimal polynomial and reduced rank extrapolation methods," J. Comput. Appl. Math., vol. 36(3), 1991, pp. 305-337.
Sidi, Avram, "Convergence and stability properties of minimal polynomial and reduced rank extrapolation algorithms," SIAM J. Numer. Anal., vol. 23, 1986, pp. 197-209.

(56) References Cited

OTHER PUBLICATIONS

Sidi, Avram, "Convergence of intermediate rows of minimal polynomial and reduced rank extrapolation tables," Numer. Algorithms, vol. 6, 1994, pp. 229-244.

Sidi, Avram, et al., "Acceleration of convergence of vector sequences," SIAM J. Numer. Anal., vol. 23, 1986, pp. 178-196.

Sidi, Avram, et al., "Convergence and stability analyses for some vector extrapolation methods in the presence of defective iteration matrices," J. Comp. Appl. Math., vol. 22, 1988, pp. 35-61.

Sidi, Avram, et al., "Upper bounds for convergence rates of acceleration methods with initial iterations," Numer. Algorithms, vol. 18, 1998, pp. 113-132.

Sidi, Avram, "Extrapolation vs. projection methods for linear systems of equations," J. Comp. Appl. Math., vol. 22, 1988, pp. 71-88.

Skelboe, Stig, "Computation of the periodic steady-state response of linear networks by extrapolation methods," IEEE Trans. Circuits and Systems, vol. 27, 1980, pp. 161-175.

Smith, David, et al., "Extrapolation methods for vector sequences", SIAM Rev., vol. 29(2), Jun. 1987, pp. 199-233.

\* cited by examiner

Original Swiss-roll $\sigma = 0.015$ $\sigma = 0.05$

Locally Linear Embedding

Laplacian Eigenmaps

Hessian LLE

Diffusion maps

Isomap

TCIE

Locally Linear Embedding

Laplacian Eigenmaps

Hessian LLE

Diffusion maps

Isomap

TCIE

Locally Linear Embedding

Laplacian Eigenmaps

Hessian LLE

Diffusion maps

Isomap

TCIE

Locally Linear Embedding

Laplacian Eigenmaps

Hessian LLE

Diffusion maps

Isomap

TCIE

ACCELERATION OF MULTIDIMENSIONAL SCALING BY VECTOR EXTRAPOLATION TECHNIQUES

FIELD OF THE INVENTION

The present invention generally relates to analyzing multidimensional data sets and, in particular, to techniques for multidimensional scaling using vector extrapolation methods to reduce the number of iterations involved in obtaining the solution point of multidimensional scaling.

BACKGROUND OF THE INVENTION

1 Introduction

Analysis of high-dimensional data is encountered in numerous pattern recognition applications. It appears that often a small number of dimensions is needed to explain the high-dimensional data. Dimensionality reduction methods such as principal components analysis (PCA) [R. O. Duda, P. E. Hart, and D. G. Stork. Pattern Classification and Scene Analysis. Wiley-Interscience, 2nd edition, 2000] and multidimensional scaling (MDS) [I. Borg and P. Groenen. Modern multidimensional scaling: Theory and applications. Springer Verlag, New York, 1997] are often used to obtain a low dimensional representation of the data. This is a commonly used pre-processing stage in pattern recognition.

Multidimensional scaling (MDS) is a generic name for a family of algorithms that, given a matrix representing the pairwise distances between a set of points in some abstract metric space, attempts to find a representation of these points in a low-dimensional (typically Euclidean) space. The distances in the target space should be as close to the original ones as possible. MDS algorithms are of great importance in the field of multidimensional data analysis. Originally introduced in the field of psychology (Warren S. Torgerson. Multidimensional scaling: I. Theory and method. PSym, 17:401-419, 1952; Jospeh B. Kruskal. Multidimensional scaling by optimizing goodness of fit to a nonmetric hypothesis. Psychometrika, 29:1-27, 1964), MDS algorithms have since then been applied to various applications. The most common applications include dimensionality reduction (Eric. L. Schwartz, Alan Shaw, and Estarose Wolfson. A numerical solution to the generalized mapmaker's problem: Flattening nonconvex polyhedral surfaces. IEEE Trans. Pattern Anal. Mach. Intell., 11:1005-1008, November 1989; Joshua B. Tenenbaum, Vin de Silva, and John C. Langford. A global geometric framework for nonlinear dimensionality reduction. Science, 290(5500):2319-2323, December 2000), visualization and analysis of data (for example, financial data (15; 33; 30), information retrieval (Brian T. Bartell, Garrison W. Cottrell, and Richard K. Belew. Latent semantic indexing is an optimal special case of multidimensional scaling. In SIGIR '92: Proceedings of the 15th annual international ACM SIGIR conference on Research and development in information retrieval, pages 161-167, New York, N.Y., USA, 1992. ACM Press), graph visualization (Emden R. Gansner, Yehuda Koren, and Stephen C. North. Graph drawing by stress majorization. In J'anos Pach, editor, Graph Drawing, volume 3383 of Lecture Notes in Computer Science, pages 239-250. Springer, 2004), texture mapping in computer graphics (Gil Zigelman, Ron Kimmel, and Nahum Kiryati. Texture mapping using surface flattening via multidimensional scaling. IEEE Transactions on Visualization and Computer Graphics, 8(2):198-207, 2002), bioinformatics (Ronald A. Fisher. The systematic location of genes by means of crossover observations. The American Naturalist, 56:406-411, 1922; Yoshihiro Taguchi and Yoshitsugu Oono. Relational patterns of gene expression via non-metric multidimensional scaling analysis. Bioinformatics, 21(6):730-740 (11), March 2005; Payel Das, Mark Mol, Hernan Stamati, Lydia E. Kavraki, and Cecilia Clementi. Low-dimensional, free-energy landscapes of protein-folding reactions by nonlineardimensionality reduction. Proc. Natl. Acad. Sci. USA, 103(26):9885-9890, June 2006), etc (Keith T. Poole. Nonparametric unfolding of binary choice data. Political Analysis, 8(3):211-237, March 2000; Shusaku Tsumoto and Shoji Hirano. Visualization of rule's similarity using multidimensional scaling. In ICDM, pages 339-346, 2003; Ka W. Cheung and Hing C. So. A multidimensional scaling framework for mobile location using time-of-arrival measurements. IEEE Transactions on Signal Processing, 53(2):460-470, 2005). More recently, MDS methods have been brought into the computer vision community as efficient methods for non-rigid shape analysis and recognition (Asi Elad and Ron Kimmel. On bending invariant signatures for surfaces. IEEE Trans. Pattern Anal. Mach. Intell., 25(10):1285-1295, 2003; Alex M. Bronstein, Michael M. Bronstein, and Ron Kimmel. Expression-invariant face recognition via spherical embedding. In Proc. IEEE International Conf. Image Processing (ICIP), 2005). The data sets encountered in the above applications are often of a very large size. At the same time, nonlinear and non-convex nature of MDS problems tends to make their solution computationally demanding. As a result, MDS algorithms tend to be slow, which makes their practical application in large-scale problems challenging or even prohibitive. A number of low-complexity algorithms that find an approximate solution to an MDS problem have been recently proposed for large-scale settings (Christos Faloutsos and King-Ip Lin. FastMap: A fast algorithm for indexing, data-mining and visualization of traditional and multimedia datasets. In Michael J. Carey and Donovan A. Schneider, editors, Proceedings of the 1995 ACM SIGMOD International Conference on Management of Data, pages 163-174, San Jose, Calif., 22-25 May 1995; Matthew Chalmers. A linear iteration time layout algorithm for visualizing high-dimensional data. In IEEE Visualization, pages 127-132, 1996; Jason Tsong-Li Wang, Xiong Wang, King-Ip Lin, Dennis Shasha, Bruce A. Shapiro, and Kaizhong Zhang. Evaluating a class of distance-mapping algorithms for data mining and clustering. In KDD '99: Proceedings of the fifth ACM SIGKDD International Conference on Knowledge Discovery and Data Mining, pages 307-311, New York, N.Y., USA, 1999. ACM Press; Vin de Silva and Joshua B. Tenenbaum. Global versus local methods in nonlinear dimensionality reduction. In Suzanna Becker, Sebastian Thrun, and Klaus Obermayer, editors, Advances in Neural Inf. Proc. Sys., pages 705-712. MIT Press, 2002; Alistair Morrison, Greg Ross, and Matthew Chalmers. Fast multidimensional scaling through sampling, springs and interpolation. Information Visualization, 2(1):68-77, 2003; Tynia Yang, Jinze Liu, Leonard McMillan, and Wei Wang. A fast approximation to multidimensionalscaling. In IEEE workshop on Computation Intensive Methods for Computer Vision, 2006; Ulrik Brandes and Christian Pich. Eigensolver methods for progressive multidimensional scaling of large data. In Michael Kaufmann and Dorothea Wagner, editors, Graph Drawing, Karlsruhe, Germany, Sep. 18-20, 2006, pages pp. 42-53. Springer, 2007). Yet, some of the applications (for example, the representation of intrinsic geometry of non-rigid shapes in computer vision) require a (numerically) exact solution, which makes approximate MDS algorithms inappropriate. Recently, Bronstein et al. proposed an efficient multigrid solver for the exact MDS problem used for non-rigid shapes recognition (Michael M.

Bronstein, Alex M. Bronstein, R. Kimmel, and I. Yavneh. Multigrid multidimensional scaling. Numerical Linear Algebra with Applications, Special issue on multigrid methods, 13(2-3):149-171, March-April 2006). The method showed significant improvement over traditional exact MDS algorithms. It made, however, heavy use of the underlying problem geometry. The generalization of this method to generic MDS problems, where the underlying geometry is not given explicitly, is not straightforward.

Multidimensional scaling can also be considered to be an alternative to factor analysis. In general, the goal of MDS is to detect meaningful underlying dimensions that allow analyzing the data in terms of an intermediate representation based on observed similarities or dissimilarities (distances) between the investigated objects. In factor analysis, the similarities between objects (e.g., variables) are expressed in the correlation matrix. MDS, on the other hand, deals with similarities or dissimilarities.

MDS is a general name for algorithms that try to find a point configuration in some metric space given a set of inter-point distances (dissimilarities). These algorithms try to minimize a cost function penalizing the deviation of inter-point distances in the point configuration from the input distances. This cost function is usually of the form $$F(X) = \sum_{\substack{i=1 \\ j>i}}^{N} w_{ij} f(d_{ij}(X), (D)_{ij}, X)$$

wherein f is the error cost associated with the distortion of a single distance, $w_{ij}$ is the weight of a specific point pair, $d_{ij}(X)$ is the inter-point dissimilarity in the new point configuration, and $(D)_{ij}$ is the given dissimilarity between the points i and j.

One specific choice for the function f is a squared error cost function. When $d_{ij}(X)$ is the Euclidean distance, this choice gives us the stress cost function or least square scaling:

$$\text{STRESS}(X) = \sum_{\substack{i=1 \\ j>i}}^{N} w_{ij} (d_{ij}(X) - (D)_{ij})^2$$

Other alternatives include squared error between squared distance values (the SSTRESS cost function), the STRAIN cost function, or non-metric MDS cost functions, such as functions penalizing the ordering of the magnitude of the distances (ordinal MDS), to name a few [I. Borg and P. Groenen. Modern multidimensional scaling: Theory and Applications. Springer Verlag, New York, 1997].

Specifically, the MDS algorithm lends itself to the case where only a notion of similarity or dissimilarity exists between points in the data set, without any initial representing coordinates. These dissimilarities can be exact quantities, such as geometric data, or vague, as in many applications of MDS in psychology or marketing research. The dissimilarities are usually specific to the applicative domain ("Bank failure: a multidimensional scaling approach"/Cecilio Mar-Molinero, Carlos Serrano-Cinca, The European Journal of Finance, June 2001, Vol 7, No. 2) ("Visualization of Rule's Similarity using Multidimensional Scaling", Shusaku Tsumoto and Shoji Hirano, Third IEEE International Conference on Data Mining (ICDM'03), pages 339-346, November 2003). In some domains, MDS is used on distances which do not translate to a concrete quantity, but are rather of a more abstract origin, such as in graph visualization. ("Graph Drawing by Stress Majorization"/E. Gansner, Y. Koren and S. North, Proceedings of 12th Int. Symp. Graph Drawing (GD'04), Lecture Notes in Computer Science, Vol. 3383, Springer Verlag, pp. 239-250, 2004).

One drawback of the MDS algorithm is its time complexity ($O(N^2)$ per iteration). It would be very useful to reduce the computational cost of the MDS algorithm, thereby allowing it to be used in new applications and scenarios.

1.1 Using MDS for Nonlinear Dimensionality Reduction

Often a more meaningful set of dissimilarities can be computed using only dissimilarities between closely related data elements. Typically, such local neighborhood distances are summed into global distances between distant data elements. This results in an approximation of the geodesic lengths [E. L. Schwartz, A. Shaw, and E. Wolfson. A numerical solution to the generalized mapmaker's problem: Flattening nonconvex polyhedral surfaces. IEEE Transactions on Pattern Analysis and Machine Intelligence, 11:1005-1008, November 1989; J. B. Tenenbaum, V. de Silva, and J. C. Langford. A global geometric framework for nonlinear dimensionality reduction. Science, 290(5500):2319-2323, December 2000]. Such algorithms allow using MDS as a non-linear dimensionality reduction method. Whereas applying linear dimensionality reduction methods to nonlinear data may result in a distorted representation, nonlinear dimensionality reduction (NLDR) methods attempt to describe a given high-dimensional data set of points as a low dimensional manifold, by a nonlinear map preserving certain properties of the data. This kind of analysis has applications in numerous fields, such as color perception, pathology tissue analysis [R. R. Coifman, S. Lafon, A. B. Lee, M. Maggioni, B. Nadler, F. Warner, and S. W. Zucker. Geometric diffusions as a tool for harmonic analysis and structure definition of data. Proceedings of the National Academy of Sciences, 102(21):7426-7431, May 2005], enhancement of Magnetic Resonance Imager (MRI) images [R. M. Diaz and A. Q. Arencibia, editors. Coloring of DT-MRI FIber Traces using Laplacian Eigenmaps, Las Palmas de Gran Canaria, Spain, Feb. 24-28, 2003. Springer Verlag], face recognition [A. M. Bronstein, M. M. Bronstein, and R. Kimmel. Three-dimensional face recognition. International Journal of Computer Vision (IJCV), 64(1):5-30, August 2005], and biochemistry [Y. Keller, S. Lafon, and M. Krauthammer. Protein cluster analysis via directed diffusion. In The fifth Georgia Tech International Conference on Bioinformatics, November 2005], to mention a few.

As the input data, we assume to be given N points in the M-dimensional Euclidean space. The points constitute vertices of a proximity graph with the set of edges E; the points $Z_i$, $Z_j$ are neighbors if $(i, j) \in E$. The data points are samples of an m-dimensional manifold $\mathcal{M} \subset \mathbb{R}^m$, where M>>m. The manifold is assumed to have a parametrization, represented by the smooth bijective map $\phi: \tilde{C} \subset \mathbb{R}^m \to \mathcal{M}$ The goal is to find a set of points $\{x_i\}_{i=1}^N \subset \mathbb{R}^m$ representing the parametrization. We will use the N×m matrix X representing the coordinates of the points in the parametrization space. Many NLDR techniques attempt finding an m-dimensional representation for the data, while preserving some local invariant. This, however, makes them vulnerable to noise in the data. Such methods include locally linear embedding (LLE) [S. T. Roweis and L. K. Saul. Nonlinear dimensionality reduction by locally linear embedding. Science, 290:2323-2326, 2000], Laplacian eigenmaps [M. Belkin and P. Niyogi. Laplacian eigenmaps and spectral techniques for embedding and clustering. In T. G. Dietterich, S. Becker, and Z. Ghahramani, editors, Advances in Neural Information Processing Systems, volume 14, pages 585-591, Cambridge, Mass., 2002. MIT Press], Hessian LLE [C. Grimes and D. L. Donoho. Hessian eigenmaps: Locally linear embedding techniques for high-dimensional data. Proceedings of the National Academy of Sciences, 100(10):5591-5596, May 2003], diffusion maps [R. R. Coifman, S. Lafon, A. B. Lee, M. Maggioni, B. Nadler, F. Warner, and S. W. Zucker. Geometric di usions as a tool for harmonic analysis and structure definition of data. Proceedings of the National Academy of Sciences, 102(21):7426-7431, May 2005], local tangent space alignment [Principal manifolds and nonlinear dimensionality reduction via tangent space alignment/ZHENYUE ZHANG and HONGYUAN ZHA, SIAM journal on scientific computing, 23(3), 2005], Semidefinite embedding [K. Q. Weinberger and L. K. Saul. Unsupervised learning of image manifolds by semidefinite programming. In Proceedings of the IEEE Conference on Computer Vision and Pattern Recognition, volume 2, pages 988-995, Washington D.C., 2004. IEEE Computer Society], and other algorithms.

Another class of algorithms preserves global invariants, like the geodesic distances $d_{ij}$, approximated as shortest paths on the proximity graph, for example. unlike local approaches, the Isomap algorithm [E. L. Schwartz, A. Shaw, and E. Wolfson. A numerical solution to the generalized mapmaker's problem: Flattening nonconvex polyhedral surfaces. IEEE Transactions on Pattern Analysis and Machine Intelligence, 11:1005-1008, November 1989; J. B. Tenenbaum, V. de Silva, and J. C. Langford. A global geometric framework for non-linear dimensionality reduction. Science, 290(5500):2319-2323, December 2000] considers both local and global invariants—the lengths of geodesics between the points on the manifold. Short geodesics are assumed to be equal to Euclidean distances, and longer ones are approximated as shortest path lengths on the proximity graph, using standard graph search methods like the Dijkstra's algorithm [T. H. Cormen, C. E. Leiserson, and R. L. Rivest. Introduction to Algorithms. MIT Press and McGraw-Hill, 1990, E. W. Dijkstra. A note on two problems in connection with graphs. Numerische Mathematik, 1:269-271, 1959]. Isomap then uses multidimensional scaling (MDS) [I. Borg and P. Groenen. Modern multidimensional scaling: Theory and applications. Springer Verlag, New York, 1997. xviii+471 pp] attempting to find an m-dimensional Euclidean representation of the data, such that the Euclidean distances between points are as close as possible to the corresponding geodesic ones, for example, using the least squares criterion (STRESS), $$X^* = \underset{X \in R^{N \times m}}{\operatorname{argmin}} \sum_{i<j} w_{ij}(d_{ij}(X) - (D)_{ij})^2$$

where $d_{ij}(X) = \|x_i - x_j\|_2$ is the Euclidean distance between points $x_i$ and $x_j$ in $\mathbb{R}^m$ The main advantage of Isomap is that it uses global geometric invariants, which are less sensitive to noise compared to local ones. Yet, its underlying assumption is that $\mathcal{M}$ is isometric to $\mathcal{C} \subset \mathbb{R}^m$ with the induced metric $d_C$, that is, $\delta(z_i, z_j) = d_{\mathbb{R}^m}(x_i, x_j)$ for all I, j=1, ..., N. If $\mathcal{C}$ is convex, the restricted metric $d_{R^m|_C}$ coincides with the induced metric $d_C$ and Isomap succeeds recovering the parametrization of $\mathcal{M}$. Otherwise, $\mathcal{C}$ has no longer Euclidean geometry and MDS cannot be used. The assumption of convexity of $\mathcal{C}$ appears to be too restrictive, as many data manifolds have complicated topology which violates this assumption. Donoho and Grimes [C. Grimes and D. L. Donoho. When does isomap recover the natural parameterization of families of articulates images? Technical Report 2002-27, Department of Statistics, Stanford University, Stanford, Calif. 94305-4065, 2002] showed examples of data in which C is non convex, and pointed out that Isomap fails in such cases. As an part of our work, we suggest a way to overcome this limitation of Isomap (cite: G. Rosman, A. M. Bronstein, M. M. Bronstein, R. Kimmel, *Human Motion—Modeling, Tracking, Capture and Animation* In B. Rosenhahn, R. Klette, D. Metaxas (Eds.)).

SUMMARY OF THE INVENTION

Multidimensional scaling (MDS) is a class of methods used to find a low-dimensional representation of a set of points given a matrix of pairwise distances between them. Problems of this kind arise in various applications, from dimensionality reduction of image manifolds to psychology and statistics. In many of these applications, efficient and accurate solution of an MDS problem is required. One major limitation of existing MDS algorithms is that they require many computationaly expensive iterations, in a setting where methods such as Quasi-Newton, Newton and conjugate gradients still take a long time to converge It is an object of the present invention to provide a method for solving an exact MDS problem.

It is a further object of the present invention to provide such method based on vector extrapolation techniques (David A. Smith, William F. Ford, and Avram Sidi. Extrapolation methods for vector sequences. SIAM Rev., 29:199-233, 1987).

The present invention relates to the use of vector extrapolation techniques to accelerate the numerical solution of MDS problems. Vector extrapolation is used to accelerate the convergence of fixed-point iterative algorithms.

These vector extrapolation techniques try to approximate the limit of a given sequence of iteration vectors, resulting from an iterative process. The limit is obtained as a linear combination of the last few iteration vectors. The vectors of the sequence in the present case are the iteration vectors resulting from an iterative solution technique for the MDS problem.

In one aspect, the present invention relates to a method for multidimensional scaling of a data set comprising a plurality of data elements, each data element identified by its coordinates, the method comprising the steps of:

(i) applying an iterative optimization technique a predetermined amount of times on a coordinates vector, the coordinates vector representing the coordinates of a plurality of said data elements, and obtaining a first modified coordinates vector;

(ii) applying a vector extrapolation technique on said first modified coordinates vector obtaining a further second modified coordinates vector; and (iii) repeating steps (i) and (ii) until one or more predefined conditions are met.

According to the invention, any iterative optimization technique can be used. In a preferred embodiment of the present invention, a stress function is used as an error measure, and the iterative optimization technique is Scaling by Majorizing a Complicated Function (SMACOF). The invention can also use any vector extrapolation technique. In preferred embodiments, the vector extrapolation technique used is Minimal Polynomial Extrapolation (MPE) or Reduced Rank Extrapolation (RRE).

Deciding when to halt the iterative optimization technique and vector extrapolation iterations can be determined by one or more predetermined criteria, for example, when the residual norm is lower than a predetermined value. Alternatively, the iterations can be halted when the stress function is less than a predetermined value.

In another aspect, the present invention relates to a solution of the nonlinear dimensionality reduction problem, based on removing pairs of points inconsistent with the convexity assumption of the Isomap algorithm. The approach, hereinafter referred to as the topologically constrained isometric embedding (TCIE), allows handling data manifolds of arbitrary topology. As an application for MDS, a new algorithm is introduced for that goal, and it is proven herein that it rejects inconsistent geodesics. We demonstrate our approach on real and synthetic data.

The present invention is well suited to work with large, multidimensional data sets even when the data is updated rapidly. Multidimensional scaling can be very useful for many applications in different fields including, but not limited to: visualization of abstract data; generic machine learning and/or semi-supervised learning for pattern recognition; image retrieval; geometric surfaces processing; identification of sampled objects; pattern classification and data mining for large data sets; data visualization for real-time data from network administration and/or supply networks and/or infrastructure; or detecting trends and components of multidimensional data.

The problem of multidimensional scaling is that of, given a dissimilarity measure between members of a set, to discover coordinate vectors, such that the distances between these representing vectors best approximate the dissimilarity measure between the members of the set. Specifically, in least squares scaling, the Euclidean distances between the representing vectors should best approximate, in the least mean square sense, a set of known distances between the members of the set. Current methods for least square scaling use the majorization approach in order to form a gradient descent process known as SMACOF. Other alternatives employ other descent methods, such as quasi-Newton or Newton.

The invention allows the usage of multidimensional scaling over larger data sets, in a shorter time and is easier to implement. For example, known solutions to the least squares scaling problem tend to involve iterative algorithms requiring large matrix-vector multiplication and high computational effort over numerous iterations compared to the method of the invention.

In the present invention, vector extrapolation methods such as Reduced Rank Extrapolation (RRE) and Minimal Polynomial Extrapolation (MPE), are used, possibly in cycling mode, to accelerate the iterations involved in obtaining the solution point of the multidimensional scaling. A specific example is to take the vectors containing the coordinates of the points during the iterations, and use Reduced Rank Extrapolation on the last 10 such vectors to extrapolate a new vector. Then separate this vector's elements into point coordinates for use as the new initial solution for a series of SMACOF steps. This allows reducing the number of iterations significantly and reducing the computation time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A shows the Swiss roll as produced by Locally Linear Embedding (LLE), FIG. 6B as produced by Laplacian eigenmaps, FIG. 6C as produced by Hessian LLE, FIG. 6D as produced by diffusion maps, FIG. 6E as produced by Isomap, FIG. 6F as produced by the TCIE algorithm of the invention. Detected boundary points are shown as red pluses.

FIG. 7A shows the Swiss roll as produced by LLE, FIG. 7B as produced by Laplacian Eigenmaps, FIG. 7C as produced by Hessian LLE, FIG. 7D as produced by diffusion maps, FIG. 7E as produced by Isomap, FIG. 7F as produced by the TCIE algorithm of the invention. Detected boundary points are shown as red pluses.

FIG. 8A shows the Swiss roll as produced by LLE, FIG. 8B as produced by Laplacian Eigenmaps, FIG. 8C as produced by Hessian LLE, FIG. 8D as produced by diffusion maps, FIG. 8E as produced by Isomap, FIG. 8F as produced by the TCIE algorithm of the invention. Detected boundary points are shown as red pluses.

FIG. 9A illustrates the embedding as produced by LLE, FIG. 9B as produced by Laplacian eigenmaps, FIG. 9C as produced by Hessian LLE, FIG. 9D as produced by diffusion maps, FIG. 9E as produced by Isomap, FIG. 9F as produced by the TCIE algorithm of the invention. Detected boundary points are shown as red pluses.

FIG. 12A shows a facial surface used as input to the canonical forms algorithm, while

FIG. 13B is a close-up of FIG. 13A.

DETAILED DESCRIPTION OF THE INVENTION

Figure 1:
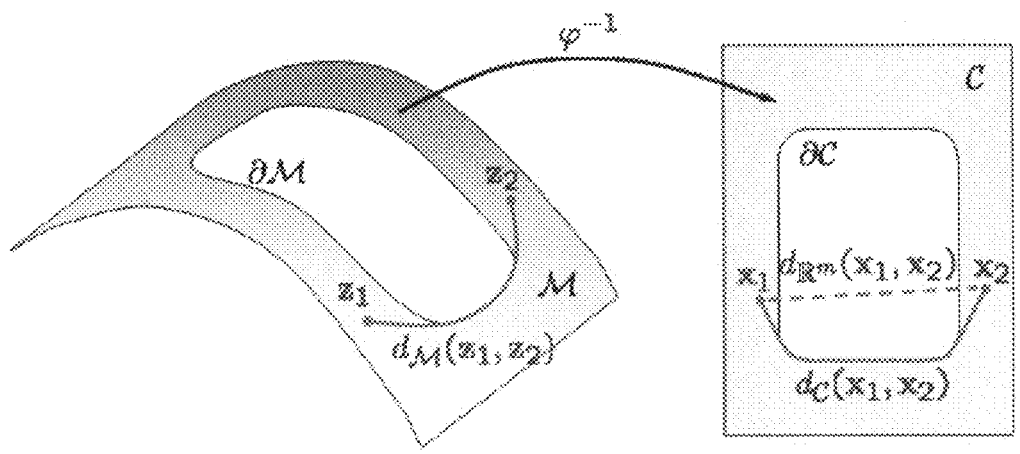
FIG. 1 is an example of inconsistent $x_1$ and $x_2$, for which the line connecting them in $R^m$ (dashed line) is shorter than the geodesic $g_C(x_1, x_2)$ (dotted curve).

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Multidimensional scaling is a very broad term, encompassing both a wide class of problems and algorithms used for their solution. Generally speaking, an MDS problem consists of finding a representation for a set of N data points, given a set of dissimilarities between them. MDS problems (and as a result, algorithms thereof) differ in the definition of the dissimilarities and the manner in which the desired representation should approximate the dissimilarities (see for more details: Ingwer Borg and Patrick Groenen. Modern multidimensional scaling: Theory and applications. Springer Verlag, New York, 1997).

When all that is expected of the representation is a correct rank ordering of the distances between various point pairs, the problem is usually referred to as ordinal MDS. The present invention focuses on another subset of MDS problems called metric MDS, in which the data is assumed to arise from an unknown metric space, and the dissimilarities are distances satisfying metric axioms. Metric MDS problems attempt to make the resulting distances as close as possible to the given ones.

Least-Squares MDS

Let us denote the coordinates of the new representation as $\{x_i\}_{i=1}^{N}$, assuming for simplicity that the points xi belong to an m-dimensional Euclidean space. We write the coordinates in the form of an N×m matrix $X=(x_{ij})$, where $x_{ij}$ is the jth coordinate of point i. Let $d_{ij}(X)$ denote the Euclidean distance between the points $x_i$ and $x_j$, and let $\delta_{ij}$ be the input distance, which we would like to preserve in the new representation.

A generic metric MDS problem can be formulated as the following optimization problem, $$\min_X \sum_{i<j} w_{ij} f_{ERR}(d_{ij}(X), \delta_{ij}),$$

where $w_{ij}$ are weights capturing the relative importance of each pairwise distance, and $f_{ERR}$ is an error cost function used for comparing the input and approximated distances. Choosing the pairwise distance error function to be a quadratic term of the difference between the input and the resulting distances, $$f_{STRESS}(d,\delta)=(d-\delta)^2,$$

we obtain the stress function. This is one of the most common objective functions. Defining the error function as a quadratic term of the difference between squared distances, $$f_{SSTRESS}(d,\delta)=(d^2-\delta^2)^2,$$

results in a function commonly known as the sstress. This cost function tends to prefer large distances over the local distances (Ingwer Borg and Patrick Groenen. Modern multidimensional scaling: Theory and applications. Springer Verlag, New York, 1997).

SMACOF Algorithm

Trying to minimize the stress function, $$s(X) = \sum_{i<j} w_{ij}(d_{ij}(X) - \delta_{ij})^2,$$

we develop the gradient of s(X) with respect to X, which can be written (Borg and Groenen 1997) as $$\nabla_s(X) = 2VX - 2B(X)X,$$

where V and B are matrices with elements given by $$(V)_{ij} = \begin{cases} -w_{ij} & \text{if } i \neq j \\ \sum_{k \neq i} w_{ik} & \text{if } i = j \end{cases} \quad (1)$$

and $$(B)_{ij} = \begin{cases} -w_{ij}\delta_{ij}d_{ij}^{-1}(X) & \text{if } i \neq j \text{ and } d_{ij}(X) \neq 0 \\ 0 & \text{if } i \neq j \text{ and } d_{ij}(X) = 0 \\ -\sum_{k \neq i} b_{ik} & \text{if } i = j \end{cases} \quad (2)$$

respectively. Using the first-order optimality condition, one obtains $$2VX = 2B(X)X,$$

or alternatively, $$X = V^\dagger B(X)X, \quad (3)$$

where † denotes the matrix pseudoinverse. This equation gave rise to the following iterative scheme (proposed by: Louis Guttman. A general nonmetric technique for finding the smallest coordinate space for a configuration of points. Psychometrika, 33:469-506, 1968), $$X^{(k+1)} = V^\dagger B(X^{(k)})X^{(k)}, \quad (4)$$

of which equation (3) can be regarded as the fixed point. Iteratively performing the transformation (3) converges to a local minimum of the stress cost function. This process is known as the SMACOF algorithm, standing from Scaling by Majorizing a Complicated Function (Borg and Groenen 1997). It can be shown to be equivalent to a weighted gradient descent with constant step size (see, e.g., Michael M. Bronstein, Alex M. Bronstein, R. Kimmel, and I. Yavneh. Multigrid multidimensional scaling. Numerical Linear Algebra with Applications, Special issue on multigrid methods, 13(2-3):149-171, March-April 2006)).

A remarkable property of the stress function is that such an algorithm guarantees a monotonously decreasing sequence of stress values, which is uncommon in general optimization problems. This property is shown by developing the iteration formula (4) using a technique known as iterative majorization (Borg and Groenen 1997). At the same time, the convergence of the SMACOF algorithm is slow, and a large number of iterations may be required if a high accuracy is needed, depending on the size of the data set and the composition of the distance matrix.

Classical Scaling

Another widely used cost function is the strain, giving rise to an algebraic MDS algorithm referred to as classical scaling. Let $\Delta^{(2)}$ and $D^{(2)}(X)$ denote the matrices of the squared input and target Euclidean distances, respectively. Let J be the centering matrix defined by $$I - \frac{1}{N}11^T,$$

whose application to a vector removes its constant component. Let us assume the coordinates of the solution have zero mean. Expressing the squared Euclidean distances, we obtain $$d^2(x_i,x_j) = \langle x_i-x_j, x_i-x_j \rangle = \langle x_i,x_i \rangle + \langle x_j,x_j \rangle - 2\langle x_i,x_j \rangle, \quad (5)$$

or, in matrix notation, $$D^2(X) = c1^T + 1c^T - 2XX^T.$$

(here $c_i = \langle x_i, x_i \rangle$).

Assuming the given distances to be Euclidean, and applying the centering matrices to the input squared distances matrix, would give us the matrix of inner products of the points (the Gram matrix), $$B_\Delta = \frac{1}{2}J\Delta^{(2)}J,$$

where in the case of Euclidean input distances, one would get $$(B_\Delta)_{ij} = \langle x_i, x_j \rangle.$$

In practice, however, the input distances are not necessarily Euclidean, and $B_\Delta$ is therefore not necessarily equal to the dot products. The discrepancy between the two is a measure of the approximation quality, referred to as strain, $$\left\| -\frac{1}{2}J(D^{(2)}(X) - \Delta^{(2)})J \right\|_F^2 = \left\| XX^T + \frac{1}{2}J(\Delta^{(2)})J \right\|_F^2$$
$$= \|XX^T - B_\Delta\|_F^2$$

(the norm here is the Frobenius norm).

The global optimum of the strain function can be found by means of eigende-composition of the matrix $B_\Delta$. Classical scaling, however, is limited both in its versatility and adaptivity (specifically, arbitrary weights for distances, or variants on the cost function usually cannot be cast into an eigenvalue problem). Furthermore, its computational cost in large problems is significant, despite several approximation methods proposed for this problem (Vin de Silva and Joshua B. Tenenbaum. Global versus local methods in nonlinear dimensionality reduction. In Suzanna Becker, Sebastian Thrun, and Klaus Obermayer, editors, Advances in Neural Inf. Proc. Sys., pages 705-712. MIT Press, 2002; Tynia Yang, Jinze Liu, Leonard McMillan, and Wei Wang. A fast approximation to multidimensionalscaling. In IEEE workshop on Computation Intensive Methods for Computer Vision, 2006; Ulrik Brandes and Christian Pich. Eigensolver methods for progressive multidimensional scaling of large data. In Michael Kaufmann and Dorothea Wagner, editors, Graph Drawing, Karlsruhe, Germany, Sep. 18-20, 2006, pages pp. 42-53. Springer, 2007).

These drawbacks make the least-squares MDS problem preferred, and thus in the following discussion, we limit ourselves to the stress function and the SMACOF algorithm. Yet, the fact that a global optimum is guaranteed makes classical scaling attractive for initializing the SMACOF algorithm (Anthony Kearsley, Richard Tapia, and Michael W. Trosset. The solution of the metric stress and sstress problems in multidimensional scaling using Newton's method. Computational Statistics, 13(3):369-396, 1998).

2 Accelerated Multidimensional Scaling

In a generic implementation of accelerated multidimensional scaling, an iterative algorithm is used to obtain a coordinate vector representing the data set, based on the dissimilarities matrix. The result of each iteration is a vector x, which holds the coordinates of the data elements. The iterations are performed in cycles, where each cycle consists of a few iterations. The results of all the iterations in the cycle are kept. These are then are sent to a vector extrapolation algorithm, which produces a new vector, representing the extrapolated limit of the sequence of vectors. The steps are:

1. Start with an initial solution $x_0$, a vector containing the coordinates representing the data set. Set n=0.
2. Use an iterative algorithm to find a more suitable representation vector for the data, creating a sequence of vectors $x_{n+1}, \ldots, x_k$ from $x_n$.
3. If during the iteration, one or more halting criteria are reached, then stop the process. Such halting criteria may include but is not limited to:
   a. The norm of the change in the vector $\|x_{n+i+1} - x_{n+i}\|$ under some norm is smaller than a specified value.
   b. The relative change in the cost function $$\frac{F_{cost}(x_{n+i}) - F_{cost}(x_{n+i+1})}{F_{cost}(x_{n+i+1})}$$

is smaller than a specified value.
   c. A specified number of iterations/cycles has elapsed.
   d. A certain amount of time has passed (for example, in real-time applications).
4. Use a vector extrapolation algorithm to obtain an approximated limit for the sequence of vectors $s = \text{VectorExtrapolate}(x_n, \ldots, x_{n+k})$. This vector is to be used as the new initial solution $x_{n+k+1}$ in the next cycle.
5. Go to step 2, until convergence, as determined by one of the tests in step 3.
6. If in a multi-scale setting, interpolate the solution into the next grid of representation, containing $\eta$ times more points. For example, take $\eta = 2$.

In a preferred embodiment, the SMACOF algorithm is used to obtain the iteration vectors, and MPE/RRE (SIDI, A., "Efficient implementation of minimal polynomial and reduced rank extrapolation methods", Journal of Computational and Applied Mathematics, Vol. 36, pp. 305-337, 1991) are used to obtain a new iteration vector after each cycle. This can be achieved in a multi-scale fashion:

1. Start with an initial solution $x_0$, as before;
2. Use the SMACOF algorithm:
   a. Represent the coordinates in a matrix X where $X^{(n)}_{ij}$ is the $j^{th}$ coordinate of the $i^{th}$ data element in the $n^{th}$ iteration;
   b. Define the matrices V,B(X) according to $$(B(X))_{ij} = \begin{cases} -w_{ij}\delta_{ij}d_{ij}^{-1} & \text{if } i \neq j \text{ and } d_{ij}(X) \neq 0 \\ 0 & \text{if } i \neq j \text{ and } d_{ij}(X) = 0 \\ -\sum_{j \neq i} b_{ij} & i = j \end{cases},$$

-continued $$(V)_{ij} = \begin{cases} -w_{ij} & \text{if } i \neq j \\ -\sum_{j \neq i} v_{ij} & \text{if } i = j \end{cases};$$

c. Compute the matrix $X^{(n+i+1)}$ according to $X^{(n+i+1)}=V^+ B(X^{(n+i)})X^{(n+i)}$;
  d. Reshape the matrix $X^{(n+i+1)}$ into a vector $x^{n+i+1}$;
3. Check one or several halting conditions, for example:
  a. The norm of the change in the vector $\|x_{n+i+1}-x_{n+i}\|$ under some norm is smaller than a specified value;
  b. The relative change in the cost function $$\frac{F_{cost}(x_{n+i}) - F_{cost}(x_{n+i+1})}{F_{cost}(x_{n+i+1})}$$

is smaller than a specified value;
  c. A specified number of iterations/cycles has elapsed;
  d. A certain amount of time has passed (for example, in real-time applications)
Stop unless the halting conditions fail;
4. Repeat steps 2-3 k times, obtaining coordinates vectors $x_n, \ldots, x_{n+k}$. k is a predetermined number, for example 10 iterations;
5. Use the RRE algorithm in order to obtain the limit of the series $s_{n,k}=\text{RRE}(x_n, \ldots, x_{n+k})$;
6. Use $s_{n,k}$ as the new initial solution for the next cycle $x_{n+k+1}=s_{n,k}$;
7. Go to step 2, repeat until convergence, as determined by one of the tests in step 3;
8. If part of a multi-scale solution, go to the next scale, interpolating the added points (A. M. Bronstein, M. M Bronstein, R. Kimmel, I. Yavneh, "Multigrid Multidimensional Scaling", Numerical Linear Algebra with Applications (NLAA), Special issue on multigrid methods, Vol. 13/2-3, pp. 149-171, March-April 2006) of the next scale.

Other alternatives may replace the least squares stress function with one of several other cost functions including, but not limited to:
1. the SSTRESS cost function;
2. the STRAIN cost function;
3. a p-norm on the distortion of distances;
4. any non-metric MDS cost function; or
5. any cost functional including a distance distortion term.

In addition, one may replace the majorization scheme used in SMACOF with other iterative optimization techniques including, but not limited to:
1. Gradient Descent algorithm—with or without line search;
2. Conjugate Gradients algorithm—with or without line search;
3. Quasi Newton algorithm—with or without line search;
4. Newton algorithm—with or without line search; or
5. Levenberg-Marquardt algorithm—with or without line search.

Vector Extrapolation Methods

Looking at the patterns of changes exhibited by the point coordinates undergoing SMACOF iterations, it seems that the general direction of the convergence process can be inferred from past iterates. This hints at the possibility of exploiting the behavior of the iterates to speed up the convergence. One possible way to predict the limit of the convergence is by using methods of vector extrapolation, such as those presented in the following section.

We present now the rationale and theory behind vector extrapolation methods. Specifically, we focus on two methods found especially useful by us in the present invention: the minimal polynomial extrapolation (MPE) (Stan Cabay and L. W. Jackson. A polynomial extrapolation method for finding limits and antilimits of vector sequences. SIAM J. Numer. Anal., 13:734-752, 1976) and the reduced rank extrapolation (RRE) (M. Mesina. Convergence acceleration for the iterative solution of the equations X=AX+f. Comput. Methods Appl. Mech. Engrg., 10:165-173, 1977; Robert P. Eddy. Extrapolating to the limit of a vector sequence. In P. C. C. Wang, editor, Information Linkage Between Applied Mathematics and Industry, pages 387-396, New York, 1979. Academic Press) are two vector extrapolation methods that have proved to be very efficient in accelerating the convergence of vector sequences that arise from fixed-point iteration schemes for nonlinear, as well as linear, large and sparse systems of equations (for a review of these methods and others, covering the relevant developments until mid 1980s, see: David A. Smith, William F. Ford, and Avram Sidi. Extrapolation methods for vector sequences. SIAM Rev., 29:199-233, 1987). The brief review we present here covers the various developments that have taken place since the publication of Smith et al, 1987.

Both methods are derived by considering vector sequences $x_0, x_1, \ldots$, generated via a linear fixed-point iteration process, namely, $$x_{n+1}=Ax_n+b, n=0,1,\ldots, \quad (6)$$

where A is a fixed N×N matrix and b is a fixed N-dimensional vector and $x_0$ is an initial vector chosen by the user. Clearly, this sequence has a limit s that is the unique solution to the linear system $$x=Ax+b, \quad (7)$$

provided $\rho(A)<1$, where $\rho(A)$ is the spectral radius of A. Note that the system in (7) can also be written as $(I-A)x=b$, and the uniqueness of the solution s follows from our assumption that $\rho(A)<1$, which guarantees that the matrix I−A is nonsingular since 1 is not an eigenvalue of A.

We now turn to simple derivations of MPE and RRE, that are based on those given by (Smith et al 1987). Other derivations, based on the Shanks-Schmidt transformation (Daniel Shanks. Nonlinear transformations of divergent and slowly convergent sequences. J. Math. and Phys., 34:1-42, 1955; J. R. Schmidt. On the numerical solution of linear simultaneous equations by an iterative method. Phil. Mag., 7:369-383, 1941] have been given by (Avram Sidi, William F. Ford, and David A. Smith. Acceleration of convergence of vector sequences. SIAM J. Numer. Anal., 23:178-196, 1986. Originally appeared as NASA TP-2193, (1983)).

Given the sequence $x_0, x_1, \ldots$, generated as in (6), let $$u_n=\Delta x_n=x_{n+1}-x_n, n=0,1,\ldots,$$

and define the error vectors $\epsilon_n$ as in $$\epsilon_n=x_n-s, n=0,1,\ldots \quad (8)$$

Making also use of the fact that $s=As+b$, one can relate the error in step n to the initial error via $$\epsilon_n=(Ax_{n-1}+b)-(As+b)=A(x_{n-1}-s)=A\epsilon_{n-1}. \quad (9)$$

which, by induction, gives $$\epsilon_n=A^n\epsilon_0, n=0,1,\ldots \quad (10)$$

We now seek to approximate s by a "weighted average" of k+1 consecutive $x_i$'s as in $$s_{n,k} = \sum_{i=0}^{k} \gamma_i x_{n+i}; \quad \sum_{i=0}^{k} \gamma_i = 1. \qquad (11)$$

Substituting Equation (8) in Equation (11), and making use of the fact that $$\sum_{i=0}^{k} \gamma_i = 1,$$

we obtain $$s_{n,k} = \sum_{i=0}^{k} \gamma_i (s + \epsilon_{n+i}) = s + \sum_{i=0}^{k} \gamma_i \epsilon_{n+i} \qquad (12)$$

which, by (10), becomes $$s_{n,k} = s + \sum_{i=0}^{k} \gamma_i A^{n+i} \epsilon_0. \qquad (13)$$

From this expression, it is clear that we must choose the scalars $\gamma_i$ to make the vector $$\sum_{i=0}^{k} \gamma_i A^{n+i} \epsilon_0,$$

the weighted sum of the error vectors $\epsilon_{n+i}$, i=0, 1, ..., k, as small as possible. As we show next, we can actually make this vector vanish by choosing k and the $\gamma_i$ appropriately.

Now, given a nonzero N×N matrix B and an arbitrary nonzero N-dimensional vector u, it is known that there exists a unique monic polynomial P(z) of smallest degree (that is at most N) that annihilates the vector u, that is, P(B)u=0. This polynomial is called the minimal polynomial of B with respect to the vector u. It is also known that P(z) divides the minimal polynomial of B, which divides the characteristic polynomial of B. Thus, the zeros of P(z) are some or all the eigenvalues of B.

Thus, if the minimal polynomial of A with respect to En is $$P(z) = \sum_{i=0}^{k} c_i z^i; \quad c_k = 1.$$

then $P(A)\epsilon_n = 0.$

By (10), this means that $$\sum_{i=0}^{k} c_i A^i \epsilon_n = \sum_{i=0}^{k} c_i \epsilon_{n+i} = 0. \qquad (14)$$

This is a set of N linear equations in the k unknowns $c_0$, $c_1$, ..., $c_{k-1}$, with $c_k$=1. In addition, these equations are consistent and have a unique solution because P(z) is unique. From these equations, it seems, however, that we need to know the vector $\epsilon_n = x_n - s$, hence the solution s. Fortunately, this is not the case, and we can obtain the $c_i$ solely from our knowledge of the vectors $x_i$. This is done as follows: Multiplying Equation (14) by A, and recalling (9), we have $$0 = \sum_{i=0}^{k} c_i A \epsilon_{n+i} = \sum_{i=0}^{k} c_i \epsilon_{n+i+1}.$$

Subtracting from this Equation (14), we obtain $$0 = \sum_{i=0}^{k} c_i (\epsilon_{n+i+1} - \epsilon_{n+i}) = \sum_{i=0}^{k} c_i (x_{n+i+1} - x_{n+i}),$$

hence the linear system $$\sum_{i=0}^{k} c_i u_{n+i} = 0. \qquad (15)$$

Once $c_0, c_1, \ldots, c_{k-1}$ have been determined from this linear system, we set $c_k = 1$ and let $$\gamma_i = c_i \bigg/ \sum_{j=0}^{k} c_j,$$

i=0, 1, ..., k. This is allowed because $$\sum_{j=0}^{k} = P(1) \neq 0$$

by the fact that I−A is not singular and hence A does not have 1 as an eigenvalue. Summing up, we have shown that if k is the degree of the minimal polynomial of A with respect to $\epsilon_n$, then there exist scalars $\gamma_0, \gamma_1, \ldots, \gamma_k$, satisfying $$\sum_{i=0}^{k} \gamma_i = 1,$$

such that $$\sum_{i=0}^{k} \gamma_i x_{n+i} = s.$$

At this point, we note that, s is the solution to (I−A)x=b, whether $\rho(A)<1$ or not. Thus, with the $\gamma_i$ as determined above, $$s = \sum_{i=0}^{k} \gamma_i x_{n+i},$$

whether $\lim_{n\to\infty} x_n$ exists or not.

In the sequel, we shall use the notation $$U_s^{(j)} = [u_j | u_{j+1} | \ldots | u_{j+s}]. \quad (16)$$

Thus, $U_s^{(j)}$ is an N×(s+1) matrix. In this notation, Equation (14) reads $$U_k^{(n)} c = 0; c = [c_0, c_1, \ldots, c_k]^T. \quad (17)$$

Of course, dividing Equation (17) by $$\sum_{i=0}^{k} c_i,$$

we also have $$U_k^{(n)} \gamma = 0; \gamma = [\gamma_0, \gamma_1, \ldots, \gamma_k]^T. \quad (18)$$

Examples of Vector Extrapolation Techniques—Minimal Polynomial Extrapolation and Reduced Rank Extrapolation We now detail two possible vector extrapolation techniques to be used—the Minimal Polynomial Extrapolation (MPE) and Reduced Rank Extrapolation (RRE) techniques. While these algorithms were derived assuming a linear iterative scheme, in practice, they work well also for nonlinear schemes, such as some processes in computational fluid dynamics [A. Sidi. Efficient implementation of minimal polynomial and reduced rank extrapolation methods. J. Comput. Appl. Math., 36(3):305-337, 1991], and prove to be also effective in the case of TCIE. For further details, we refer to [S. Cabay and L. Jackson. Polynomial extrapolation method for finding limits and antilimits of vector sequences. SIAM Journal on Numerical Analysis, 13(5): 734-752, October 1976; R. P. Eddy. Extrapolation to the limit of a vector sequence. In P. C. Wang, editor, Information Linkage between Applied Mathematics and Industry, pages 387-396. Academic Press, 1979; D. A. Smith, W. F. Ford, and A. Sidi. Extrapolation methods for vector sequences. SIAM Review, 29(2):199-233, June 1987].

The main idea of these methods is, given a sequence of solutions $X^{(k)}$ from iterations k=0, 1, . . . , to approximate the limit $\lim_{k\to\infty} X^{(k)}$, which should coincide with the optimal solution X*. The extrapolation $\hat{X}^{(k)}$ is constructed as an affine combination of last K+1 iterates, $X^{(k)}, \ldots, X^{(k+K)}$ $$\hat{X}^{(k)} = \sum_{j=0}^{K} \gamma_j X^{(k+j)}; \sum_{j=0}^{K} \gamma_j = 1.$$

The coefficients $\gamma_j$ can be determined in various ways. In the reduced rank extrapolation (RRE) method, $\gamma_j$ are obtained by the solution of the minimization problem, $$\min_{\gamma_0, \ldots, \gamma_K} \left\| \sum_{j=0}^{K} \gamma_j \Delta X^{(k+j)} \right\|, \quad \text{s.t.} \sum_{j=0}^{K} \gamma_j = 1,$$

where $\Delta X^{(k)} = X^{(k+1)} - X^{(k)}$. In the minimal polynomial extrapolation (MPE) method, $$\gamma_j = \frac{c_j}{\sum_{j=0}^{K} c_j}, \quad j = 0, 1, \ldots, K,$$

where $c_j$ arise from the solution of the minimization problem, $$\min_{c_0, \ldots, c_{K-1}} \left\| \sum_{j=0}^{K} c_j \Delta X^{(k+j)} \right\|, \quad c_K = 1,$$

which in turn can be formulated as a linear system [D. A. Smith, W. F. Ford, and A. Sidi. Extrapolation methods for vector sequences. SIAM Review, 29(2):199-233, June 1987].

Derivation of MPE

As we already know, the degree of the minimal polynomial of A with respect to $\epsilon_n$ can be as large as N. This makes the process we have just described a prohibitively expensive one since we have to save all the vectors $x_{n+1}$ i=0, 1, . . . , k+1, which is a problem when N is very large. In addition, we also do not have a way to know this degree. Given these facts, we modify the approach we have just described as follows: We choose k to be an arbitrary positive integer that is normally (much) smaller than the degree of the minimal polynomial of A with respect to $\epsilon_n$. With this k, the linear system in Equation (15) is not consistent, hence does not have a solution for $c_0$, $c_1, \ldots, c_{k-1}$, with ck=1, in the ordinary sense. Therefore, we solve this system in the least squares sense. Following that, we compute $\gamma_0, \gamma_1, \ldots, \gamma_k$ precisely as described following Equation (15), and then compute the vector $$s_{n,k} = \sum_{i=0}^{k} \gamma_i x_{n+i}$$

as our approximation to s. The resulting method is known as the minimal polynomial extrapolation method (MPE). Clearly, MPE takes as its input only the integers k and n and the vectors $x_n, x_{n+1}, \ldots, x_{n+k+1}$, hence can be employed whether these vectors are generated by a linear or nonlinear iterative process. We summarize the definition of MPE in Table 1.

TABLE 1

The minimal polynomial extrapolation algorithm Derivation of RRE

| | |
|---|---|
| 1 | Choose the integers k and n, and input the vectors $x_n, x_{n+1}, \ldots, x_{n+k}$. |
| 2 | Form the N × k + 1 matrix $U_k^{(n)}$. |
| 3 | Solve the overdetermined linear system $U_{k-1}^{(n)} c' = -u_{n+k}$ by least squares. Here $c' = [c_0, c_1, \ldots, c_{k-1}]^T$. |
| 4 | Set $c_k = 1$, and $\gamma_i = c_i / \sum_{i=0}^{k} c_i$, i = 0, 1, ..., k. |
| 5 | Compute the vector $s_{n,k} = \sum_{i=0}^{k} \gamma_i x_{n+i}$ as approximation to $\lim_{i\to\infty} x_i = s$. |

Again, we choose k to be an arbitrary positive integer that is normally (much) smaller than the degree of the minimal polynomial of A with respect to $\epsilon_n$. With this k, the linear system in Equation (18) is not consistent, hence does not have a solution for $\gamma_0, \gamma_1, \ldots, \gamma_k$, in the ordinary sense. Therefore, we solve this system in the least squares sense, subject to the constraint $$\sum_{i=0}^{k} \gamma_i = 1.$$

Following that, we compute the vector $$s_{n,k} = \sum_{i=0}^{k} \gamma_i x_{n+i}$$

as our approximation to s. The resulting method is known as the reduced rank extrapolation method (RRE). Clearly, RRE, just as MPE, takes as its input only the integers k and n and the vectors $x_n, x_{n+1}, \ldots, x_{n+k+1}$, hence can be employed whether these vectors are generated by a linear or nonlinear iterative process. We summarize the definition of RRE in Table 2.

TABLE 2

The reduced rank extrapolation algorithm

1. Choose the integers k and n, and input the vectors $x_n, x_{n+1}, \ldots, x_{n+k}$.
2. Form the N × k + 1 matrix $U_k^{(n)}$.
3. Solve the overdetermined linear system $U_k^{(n)} \gamma = 0$ by least squares, subject to the constraint $\sum_{i=0}^{k} \gamma_i = 1$. Here $\gamma = [\gamma_0, \gamma_1, \ldots, \gamma_k]^T$.

4. Compute the vector $s_{n,k} = \sum_{i=0}^{k} \gamma_i x_{n+i}$ as approximation to $\lim_{i \to \infty} x_i = s$.

Treatment of Nonlinear Equations

We now turn to the treatment of nonlinear equations, such as those used in the SMACOF algorithm, by vector extrapolation methods. Assume that the system of nonlinear equations in question has been written in the (possibly preconditioned) form $$x = F(x), \quad (19)$$

where F(x) is an N-dimensional vector-valued function and x is the N-dimensional vector of unknowns. Let the sequence of approximations $x_n$ to the solution s be generated via $$x_{n+1} = F(x^n), n = 0, 1, \ldots, \quad (20)$$

and assume that this sequence converges to the solution vector s. In our case, F is the right-hand side of the SMACOF iteration (given in a general form in Equation (4)). For x close to s, F(x) can be expanded in a Taylor series in the form $$F(x) = F(s) + F'(s)(x-s) + O(\|x-s\|^2) \text{ as } x \to s.$$

Here F'(x) is the Jacobian matrix of the vector-valued function F(x). Recalling also that F(s)=s, this expansion can be put in the form $$F(x) = s + F'(s)(x-s) + O(\|x-s\|^2) \text{ as } x \to s.$$

By the assumption that the sequence $x_0, x_1, \ldots$, converges to s [which takes place provided $\rho(F'(s)) < 1$], it follows that $x_n$ is close to s for all large n, and hence $$lX_{n+1} = s + F'(s)(x_n - s) + O(\|x_n - s\|^2) \text{ as } n \to \infty.$$

Rewriting this in the form $$x_{n+1} - s = F'(s)(x_n - s) + O(\|x_n - s\|^2) \text{ as } n \to \infty,$$

we realize that, for all large n, the vectors $x_n$ behave as if they were generated by a linear system of the form (I–A)x=b via $$x_{n+1} = Ax_n + b, n = 0, 1, \ldots, \quad (21)$$

where A=F'(s) and b=[I–F'(s)]s. This suggests that the extrapolation methods MPE and RRE [that were designed by considering vector sequences generated by a linear fixed-point iterative process as in (6)] can be applied to sequences of vectors obtained from nonlinear fixed-point iterative methods. Indeed, methods such as MPE and RRE have been applied with success to the numerical solution of large and sparse nonlinear systems of equations arising in various areas of science and engineering, such as computational fluid dynamics, semiconductor research, and computerized tomography.

Efficient Implementation of MPE and RRE

The above definitions of MPE and RRE actually form the basis for efficient implementations of MPE and RRE (Avram Sidi. Efficient implementation of minimal polynomial and reduced rank extrapolation methods. J. Comp. Appl. Math., 36:305-337, 1991. Originally appeared as NASA TM-103240 ICOMP-90-20). The most important aspect of these implementations is the accurate solution of the relevant least-squares problems and minimization of computing time and storage requirements. The implementations we give in the sequel, were developed by (Avram Sidi. Efficient implementation of minimal polynomial and reduced rank extrapolation methods. J. Comp. Appl. Math., 36:305-337, 1991. Originally appeared as NASA TM-103240 ICOMP-90-20).

In these implementations, the least-squares problems are solved by using QR factorizations of the matrices $U_k^{(n)}$, as in $$U_k^{(n)} = Q_k R_k.$$

Here $Q_k$ is an N×(k+1) unitary matrix satisfying $Q_k^* Q_k = I_{(k+1) \times (k+1)}$. Thus, $Q_k$ has the columnwise partition $$Q_k = [q_0 | q_1 | \ldots | q_k], \quad (22)$$

such that the columns $q_i$ form an orthonormal set of N-dimensional vectors, that is, $q_i^* q_j = \delta_{ij}$. The matrix $R_k$ is a (k+1)×(k+1) upper triangular matrix with positive diagonal elements. Thus, $$R_k = \begin{bmatrix} r_{00} & r_{01} & \cdots & r_{0k} \\ & r_{11} & \cdots & r_{1k} \\ & & \ddots & \vdots \\ & & & r_{kk} \end{bmatrix}; r_{ii} > 0, i = 0, 1, \ldots, k. \quad (23)$$

This factorization can be carried out easily and accurately using the modified Gram-Schmidt ortogonalization process (MGS), which is a standard numerical algorithm (Gene H. Golub and Charles F. Van Loan. Matrix Computations. The Johns Hopkins University Press, London, third edition, 1996; Avram Sidi. Efficient implementation of minimal polynomial and reduced rank extrapolation methods. J. Comp. Appl. Math., 36:305-337, 1991. Originally appeared as NASA TM-103240 ICOMP-90-20). For completeness, Table 3 describes the steps of MGS as applied to the matrix $U_k^{(n)}$:

TABLE 3

The modified Gram-Schmidt algorithm

1. Compute $r_{00} = \|u_n\|$ and $q_0 = u_n/r_{00}$
2. for i = 1, ..., k do
3.    Set $u_i^{(0)} = u_{n+i}$ for j = 0, ..., i − 1 do
4.    $r_{jk} = q_j^* u_i^{(j)}$ and $u_i^{(j+1)} = u_i^{(j)} - r_{jk} q_j$
5.    end
6.    Compute $r_{ii} = \|u_i^{(i)}\|$ and $q_i = u_i^{(i)}/r_{ii}$.
7. end Here, $\|x\|=\sqrt{x^*x}$. In addition, the vector $u_i^{(j-1)}$ overwrites $u_i^{(j)}$, so that the vectors $u_{n+i}$, $u_i^{(j)}$ and $q_i$ all occupy the same storage location.

Note that $Q_k$ is obtained from $Q_{k-1}$ by appending to the latter the vector $q_k$ as the (k+1)st column. Similarly, $R_k$ is obtained from $R_{k-1}$ by appending to the latter the 0 vector as the (k+1)st row and then the vector $[r_{0k}, r_{1k}, \ldots, r_{kk}]^T$ as the (k+1)st column.

An important point to be emphasized is that, when forming the matrix $U_k^{(n)}$, we overwrite the vector $x_{n+i}$ with $u_{n+i} = \Delta x_{n+i}$ as soon as the latter is computed, for i=1, ..., k. We save only $x_n$. Next, when computing the matrix $Q_k$, we overwrite un+i with $q_i$, i=0, 1, ..., k. This means that, at all stages of the computation of $Q_k$ and $R_k$, we are keeping only k+2 vectors in the memory. The vectors $x_{n+1}, \ldots, x_{n+k+1}$ need not be saved.

With the QR factorization of $U_k^{(n)}$ (hence of $U_{k-1}^{(n)}$) available we can give algorithms for MPE and RRE within a unified framework as shown in Table 4.

TABLE 4

An efficient implementation of the MPE/RRE algorithms

Input: k and n and the vectors $x_n, x_{n+1}, \ldots, x_{n+k+1}$.
1. Compute the vectors $u_{n+i} = \Delta x_{n+i}$, i = 0, 1, ..., k, and form the N × (k + 1) matrix
$$U_k^{(n)} = [u_n | u_{n+1} | \ldots | u_{n+k}],$$
and form its QR factorization, namely, $U_k^{(n)} = Q_k R_k$, with $Q_k$ and $R_k$ as in (22) and (23).
2. Determination of the $\gamma_i$:
   // For MPE
3. With $\rho_k = [r_{0k}, r_{1k}, \ldots, r_{k-1,k}]^T$, solve the k × k upper triangular system
$$R_{k-1} c' = -\rho_k;\ c' = [c_0, c_1, \ldots, c_{k-1}]^T.$$
Set $c_k = 1$, and $\gamma_i = c_i / \sum_{i=0}^{k} c_i$, i = 0, 1, ..., k.

// For RRE
4. With $e = [1, 1, \ldots, 1]^T$, solve the (k + 1) × (k + 1) linear system
$$R_k^* R_k d = e;\ d = [d_0, d_1, \ldots, d_k]^T.$$
This amounts to solving two triangular systems: First $R_k^* a = e$ for a, and, following that, $R_k d = a$ for d. Next, compute
$$\lambda = 1 / \sum_{i=0}^{k} d_i;\ \lambda \text{ is always positive (it becomes zero only when}$$
$s_{n,k} = s$ in the linear case). Next, set $\gamma = \lambda d$, that is $\gamma_i = \lambda d_i$, i = 0, 1, ..., k.
5. With the $\gamma_i$ computed, compute $\xi = [\xi_0, \xi_1, \ldots, \xi_{k-1}]^T$ via
$$\xi_0 = 1 - \gamma_0;\ \xi_j = \xi_{j-1} - \gamma_j, j = 1, \ldots, k-1.$$
6. Compute
$$\eta = [\eta_0, \eta_1, \ldots, \eta_{k-1}]^T = R_{k-1} \xi.$$
7. Then compute
$$s_{n,k} = x_n + Q_{k-1} \eta = x_n + \sum_{i=0}^{k-1} \eta_i q_i.$$

Error Estimation

One common way of assessing the quality of the approximation $s_{n,k}$ is by looking at the residual vector $r(s_{n,k})$ associated with it. For linear sequences: When the iteration vectors $x_i$ are generated linearly as in (6), we have $$r(x) = b - (I - A)x = (Ax + b) - x.$$

Thus, $$r(x_n) = x_{n+1} - x_n = u_n.$$

Invoking also $$\sum_{i=0}^{k} \gamma_i = 1,$$

where $\gamma_i$ are as obtained when applying MPE or RRE, we therefore have $$r(s_{n,k}) = \sum_{i=0}^{k} \gamma_i u_{n+i} = U_k^{(n)} \gamma. \quad (24)$$

We actually look at the $l_2$-norm of this vector, namely, $$\|r(s_{n,k})\| = \|U_k^{(n)} \gamma\|.$$

For nonlinear sequences: When the $x_i$ are generated nonlinearly as in (20), with $s_{n,k}$ close to s, we have $$r(s_{n,k}) = F(s_{n,k}) - s_{n,k} \approx U_k^{(n)} \gamma.$$

Thus,

Whether the vectors $x_i$ are generated linearly or nonlinearly, $\|U_k^{(n)} \gamma\|$ can be computed and in terms of already computed quantities and at no cost, even without having to compute $s_{n,k}$. Indeed, we have $$\|U_k^{(n)} \gamma\| = \begin{cases} r_{kk} |\gamma_k| & \text{for } MPE \\ \sqrt{\lambda} & \text{for } RRE \end{cases}$$

Here, $r_{kk}$ is the last diagonal element of the matrix $R_k$ and $\lambda$ is the parameter computed in Step 3 of the algorithms in the preceding subsection (Avram Sidi 1991).

Error Analysis for MPE and RRE

The analysis of MPE and RRE, within the context of linear systems, has been carried out in the works (Avram Sidi. Convergence and stability properties of minimal polynomial and reduced rank extrapolation algorithms. SIAM J. Numer. Anal., 23:197-209, 1986. Originally appeared as NASA TM-83443 (1983); Avram Sidi and J. Bridger. Convergence and stability analyses for some vector extrapolation methods in the presence of defective iteration matrices. J. Comp. Appl. Math., 22:35-61, 1988; Avram Sidi. Convergence of intermediate rows of minimal polynomial and reduced rank extrapolation tables. Numer. Algorithms, 6:229-244, 1994; Avram Sidi and Yair Shapira. Upper bounds for convergence rates of vector extrapolation methods on linear systems with initial iterations. Technical Report 701, Computer Science Department, Technion-Israel Institute of Technology, 1991. Appeared also as NASA Technical memorandum 105608, ICOMP-92-09, (1992); Avram Sidi and Yair Shapira. Upper bounds for convergence rates of acceleration methods with initial iterations. Numer. Algorithms, 18:113-132, 1998). This analysis sheds considerable light on what vector extrapolation methods can achieve when they are applied in conjunction with iterative methods arising from nonlinear systems as well as linear ones.

The following result was given by [Avram Sidi. Convergence and stability properties of minimal polynomial and reduced rank extrapolation algorithms. SIAM J. Numer. Anal., 23:197-209, 1986. Originally appeared as NASA TM-83443 (1983)].

Theorem 1.

Assume that the vectors $x_n$ satisfy $$x_n = s + \sum_{i=1}^{P} v_i \lambda_i^n,$$

where the vectors $v_i$ are linearly independent, and the nonzero scalars $\lambda_i \neq 1$ are distinct, and ordered as in $$|\lambda_1| \geq |\lambda_2| \geq \ldots.$$

If also $$|\lambda_k| > |\lambda_{k+1}|,$$

then, both for MPE and RRE, there holds $$s_{n,k} - s = O(\lambda_{k+1}^n) \text{ as } n \to \infty,$$

and $$\lim_{n \to \infty} \sum_{i=0}^{k} \gamma_i^{(n,k)} z^i = \prod_{i=1}^{k} \frac{\lambda - \lambda_i}{1 - \lambda_i}.$$

Here $\gamma_i^{(n,k)}$ stands for $\gamma_i$.

Note that when the $x_n$ are generated by the iterative procedure in (6), they are precisely as described in this theorem, with $\lambda_i$ being some or all of the distinct nonzero eigenvalues of the iteration matrix A and $v_i$ being eigenvectors corresponding to these eigenvalues, when A is diagonalizable.

When the condition $|\lambda_k| > |\lambda_{k+1}|$ does not hold Theorem 1 above needs to be modified somewhat. This has been done previously (Avram Sidi. Convergence of intermediate rows of minimal polynomial and reduced rank extrapolation tables. Numer. Algorithms, 6:229-244, 1994), and we state a special case of it next.

Theorem 2.

Assume that the vectors $x_n$ have been generated by the iterative procedure $x_{n+1}=Ax_n+b$, the matrix I−A being nonsingular. Denote the solution of $(I−A)x=b$ by s. Let us order the nonzero distinct eigenvalues $\lambda_i$ of A as in $$|\lambda_1| \geq |\lambda_2| \geq \ldots.$$

Then, whether $|\lambda_k| > |\lambda_{k+1}|$ or not, there holds $$s_{n,k} - s = O(\lambda_{k+1}^n) \text{ as } n \to \infty,$$

(i) for RRE unconditionally and (ii) for MPE provided the eigenvalues of I−A lie strictly on one side of a straight line through the origin in the complex plane, which happens when A+A' is positive definite, for example.

In connection with Theorems 1 and 2, we note that we have not assumed that $\lim_{n \to \infty} x_n$ exists. Clearly, $\lim_{n \to \infty} x_n$ exists and is equal to s provided $|\lambda_1| < 1$. In case $\lim_{n \to \infty} x_n$ does not exist, we have that $|\lambda_1| \geq 1$ necessarily. Now, if we use the $x_i$, as they are, to approximate s, we have the error $$\epsilon_n = x_n - s = O(\lambda_1^n) \text{ as } n \to \infty.$$

Thus, provided $|\lambda_{k+1}| < 1$, we have that $\lim_{n \to \infty} s_{n,k} = s$, whether $\lim_{n \to \infty} x_n$ exists or not. Furthermore, when the sequence $x_n$ converges (to s), $S_{n,k}$ converges (to s) faster, provided $|\lambda_{k+1}| < |\lambda_1|$. In words, MPE and RRE accelerate the convergence of the sequence $\{x_n\}$.

Cycling with MPE and RRE

The results of Theorems 1 and 2 pertain to the convergence and acceleration of convergence of MPE and RRE. In these theorems, we keep k fixed and let n go to infinity. Obviously, there is no way of letting n go to infinity in practice. It also follows from Theorems 1 and 2 that increasing k generally makes MPE and RRE converge faster. However, we have no way of increasing k indefinitely, because this would increase the storage requirements and also increase the computational cost tremendously.

In case we are solving the system x=F(x) and the vectors $x_i$ are generated via the fixed-point iterative procedure $x_{n+1}=F(x_n)$, we can employ a mode of application called cycling or restarting in which n and k are held fixed. Here are the steps of this mode. We will call each application of Steps 1-3 a cycle. We will also denote the $s_{n,k}$ that is computed in the ith cycle $s_{n,k}^{(i)}$.

A discussion of the error in this mode of usage—in case of linear F(x), i.e., when F(x)=Ax+b—was given previously (Avram Sidi and Yair Shapira. Upper bounds for convergence rates of vector extrapolation methods on linear systems with initial iterations. Technical Report 701, Computer Science Department, Technion-Israel Institute of Technology, 1991. Appeared also as NASA Technical memorandum 105608, ICOMP-92-09, (1992); Avram Sidi and Yair Shapira. Upper bounds for convergence rates of acceleration methods with initial iterations. Numer. Algorithms, 18:113-132, 1998). The relevant errors can be shown to have upper bounds that are expressible in terms of Jacobi polynomials for certain types of spectra of the matrix A, and these bounds turn out to be quite tight. They also indicate that, with even moderate n, $s_{n,k}^{(i)}$ may be very good approximations to the solution s with small k, hence small storage and few iterations. Another advantage of applying MPE and RRE in this mode (that is, with n>0) is that it prevents stagnation in the cases where GMRES stagnates. (See the numerical examples in (Avram Sidi and Yair Shapira. Upper bounds for convergence rates of vector extrapolation methods on linear systems with initial iterations. Technical Report 701, Computer Science Department, Technion-Israel Institute of Technology, 1991. Appeared also as NASA Technical memorandum 105608, ICOMP-92-09, (1992); Avram Sidi and Yair Shapira. Upper bounds for convergence rates of acceleration methods with initial iterations. Numer. Algorithms, 18:113-132, 1998)). Numerical experiments confirm that this is indeed the case. Furthermore, this is the case for nonlinear systems of equations as well, even though the analysis of (Avram Sidi and Yair Shapira. Upper bounds for convergence rates of vector extrapolation methods on linear systems with initial iterations. Technical Report 701, Computer Science Department, Technion-Israel Institute of Technology, 1991. Appeared also as NASA Technical memorandum 105608, ICOMP-92-09, (1992); Avram Sidi and Yair Shapira. Upper bounds for convergence rates of acceleration methods with initial iterations. Numer. Algorithms, 18:113-132, 1998) does not apply to this case in a straightforward manner.

The analysis of MPE and RRE as these are applied to nonlinear systems in the cycling mode has been considered in works by (Stig Skelboe. Computation of the periodic steady-state response of nonlinear networks by extrapolation methods. IEEE Trans. Circuits and Systems, 27:161-175, 1980; David A. Smith, William F. Ford, and Avram Sidi. Extrapolation methods for vector sequences. SIAM Rev., 29:199-233, 1987). What can be said heuristically is that, when k in the ith cycle is chosen to be $k_i$, the degree of the minimal polynomial of the matrix F'(s) with respect to $\epsilon_0 = x_0 - s$, the sequence $\{s_{n,k_i}^{(i)}\}_{i=0}^{\infty}$ converges to s quadratically. However, we must add that, since the $k_i$ can be as large as N and are not known exactly, this usage of cycling is not useful practically for the large-scale problems we are interested in solving. In other words, trying to achieve quadratic convergence from MPE and RRE via cycling may not be realistic. With even moderate values of n and k, we may achieve linear but fast convergence nevertheless. This turns out to be the case even when $x_n$ is far from the solution s.

Connection with Krylov Subspace Methods

When applied to linearly generated sequences, MPE and RRE are very closely related to the method of Arnoldi (Walter .E. Arnoldi. The principle of minimized iterations in the solution of the matrix eigenvalue problem. Quart. Appl. Math., 9:17-29, 1951) and to GMRES (Yousef Saad and Martin H. Schultz. GMRES: A generalized minimal residual method for solving nonsymmetric linear systems. SIAM J. Sci. Statist. Comput., 7:856-869, 1986), two well known Krylov subspace methods. The following result was stated by (Avram Sidi. Extrapolation vs. projection methods for linear systems of equations. J. Comp. Appl. Math., 22:71-88, 1988).

Theorem 3.

Consider the linear system $(I-A)x=b$. With $x_0$ as the initial vector, let the vector sequence $\{x_n\}$ be generated via $x_{n+1} = Ax_n + b$, and let $s_{0,k}^{MPE}$ and $S_{0,k}^{RRE}$ be obtained from this sequence by applying, respectively, MPE and RRE. Let also the vectors $s_k^{Arnoldi}$ and $s_k^{GMRES}$ be the vectors obtained by applying, respectively, k steps of the method of Arnoldi and GMRES to $(I-A)x=b$, with $x_0$ as the starting vector. Then $s_{0,k}^{MPE} = s_k^{Arnoldi}$ and $s_{0,k}^{RRE} = s_k^{GMRES}$.

We also recall that the method of Arnoldi becomes the method of conjugate gradients when A is a Hermitian matrix.

It must be noted that the equivalence of MPE and RRE to the method of Arnoldi and to GMRES is mathematical and not algorithmic. The algorithms (computational procedures) are different.

Cycling the SMACOF Algorithm

In order to accelerate the convergence of the SMACOF algorithm, we use cycling mode. Since the problem at hand is nonlinear, there is no guarantee that the approximate limit vector given by extrapolation will result in a lower stress value. We therefore have to use a safeguard. One possibility is to check the stress value at the extrapolated limit, and if the resulting stress is higher, use the last iteration vector instead, as the initial solution to the next cycle. This is simply done by changing step 5 in Table 5. An algorithmic description is shown in Table 6. Another possibility, instead of a simple safeguard, is to use a diminishing step size, halving the step size several times before resorting to the last iteration vector.

TABLE 5

Using vector extrapolation techniques in cycling mode

1 Choose integers n, k, and an initial vector $x_0$.
2 Compute the vectors $x_i$, $1 \le i \le n + k + 1$, [via $x_{n+1} = F(x_n)$], and save $x_{n+i}$, $0 \le i \le k + 1$.
3 Apply MPE or RRE to the vectors $x_{n+i}$, $0 \le i \le k + 1$, precisely as described in subsection (3.4), with end result $s_{n,k}$.
4 If $s_{n,k}$ satisfies accuracy test, stop.
5 Otherwise, set $x_0 = s_{n,k}$, and go to Step 1.

TABLE 6

Using vector extrapolation techniques for accelerating the SMACOF algorithm

1 Choose integers n, k, and an initial vector $x_0$.
2 Perform n iterations of the SMACOF algorithm
3 Perform additional k iterations of the SMACOF algorithm, saving the iterants as $x_{n+i}$, $0 \le i \le k$
4 Apply MPE or RRE to the vectors $x_{n+i}$, $0 \le i \le k + 1$, precisely as described in subsection (3.4), with end result $s_{n,k}$.
5 If stress $(x_{n+k}) \le$ stress $(s_{n,k})$, take $s_{n,k}$ to be $x_{n+k}$
6 If $s_{n,k}$ satisfies accuracy test based on relative stress change, stop.
7 Otherwise, set $x_0 = s_{n,k}$, and go to Step 1.

Further Convergence Acceleration by Multiscale Optimization

Another way to accelerate the solution of the MDS problem is using multiresolution (MR) methods [M. M. Bronstein, A. M. Bronstein, and R. Kimmel. Multigrid multidimensional scaling. Numerical Linear Algebra with Applications (NLAA), 13(2-3):149-171, March-April 2006]. The main idea is subsequently approximating the solution by solving the MDS problem at different resolution levels. At each level, we work with a grid consisting of points with indices $\Omega_L \subset \Omega_{L-1} \subset \ldots \subset \Omega_0\{1, \ldots, N\}$ such that $|\Omega_l| = N_l$. At the lth level, the data is represented as an $N_l \times N_l$ matrix $\Delta_l$, obtained by extracting the rows and columns of $\Delta_0 = \Delta$, corresponding to the indices $\Omega_l$. The solution $X_l^*$ of the MDS problem on the lth level is transferred to the next level l−1 using an interpolation operator $P_l^{l-1}$, which can be represented as an $N_{l-1} \times N_l$ matrix.

We use a modification of the farthest point sampling (FPS) [Y. Eldar, M. Lindenbaum, M. Porat, and Y. Zeevi. The farthest point strategy for progressive image sampling. IEEE Transactions on Image Processing, 6(9): 1305-1315, September 1997] strategy to construct the grids, in which we add more points from the boundaries, to allow correct interpolation of the fine grid using the coarse grid elements. We use linear interpolation with weights determined using a least squares fitting problem with regularization made to ensure all available nearest neighbors are used.

1 Construct the hierarchy of grids $\Omega_0, \ldots, \Omega_L$ and interpolation operators $P_1^0, \ldots, P_L^{L-1}$.

2 Start with some initial $X_L^{(0)}$ at the coarsest grid, and $l = L$.

3 while $l \ge 0$ do

4 Solve the lth level MDS problem $$X_l^* = \operatorname*{argmin}_{X_l \in R^{N_l \times m}} \sum_{i,j \in \Omega_l} w_{ij}(d_{ij}(X_l) - \delta_{ij})^2$$

using SMACOF iterations initialized with $X_l^{(0)}$.

Figure 3:
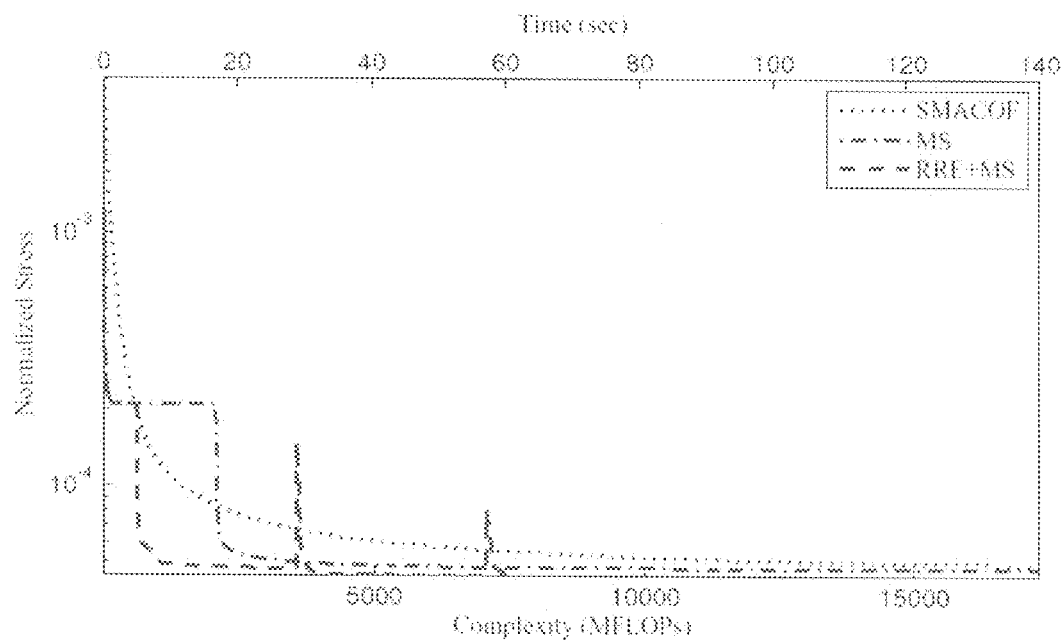
FIG. 3 shows two graphs showing Convergence (in terms of stress value) of basic SMACOF (dotted), SMACOF with multiresolution acceleration (solid), SMACOF with RRE (dash-dotted) and SMACOF with both RRE and multiscale (dashed), in terms of CPU time and MFLOPS. CPU time is approximated. Convergence was stopped at the same relative change of stress value.
Figure 3:
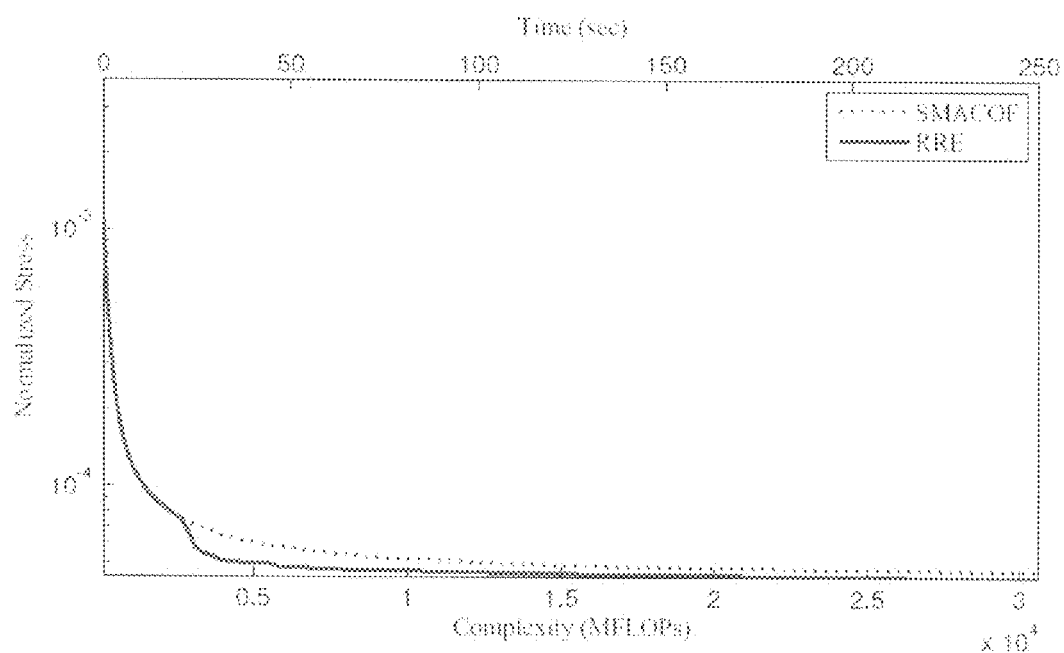

5 Interpolate the solution to the next resolution level, $X_{l-1}^{(0)} = P_l^{l-1}(X_l^*)$ 6 $l \leftarrow l - 1$ 7 end The multiresolution scheme can be combined with vector extrapolation by employing MPE or RRE methods at each resolution level. In our experiments we used the RRE method, although in practice, for the SMACOF algorithm, both the MPE and the RRE algorithms gave comparable results, giving us a three-fold speedup. A comparison of the convergence with and without vector extrapolation and multiresolution methods is shown in FIG. 3. The stress values shown are taken from the TCIE problem shown in FIG. 6. Major spikes in the stress function of the appropriate method's graph indicate a change in the resolution level with inaccurate interpolation.

3 Topologically Constrained Isometric Embedding (TCIE)

We now describe a specific application which uses MDS, and as such is a candidate for using accelerated MDS. This algorithm is called Topologically Constrained Isometric Embedding, and is an improvement upon the Isomap algorithm. As mentioned before, the Isomap algorithm assumes that the parametrization C of $\mathcal{M}$ is a convex subset of $\mathbb{R}^m$, and relies on the isometry assumption to find the map from $\mathcal{M}$ to the metric space $(C, d_C)$ by means of MDS (the stress in the solution will be zero). MDS can be used because $d_C = d_{R^m}|_C$ due to the convexity assumption. In the case when C is non-convex, this is not necessarily true, as there may exist pairs of points for which $d_C \neq d_{R^m}|_C$. We call such pairs inconsistent. An example of such a pair is shown in FIG. 1. We denote the set of all consistent pairs by $$P = \{(i,j): d_C(x_i, x_j) = d_{R^m}|_C(x_i, x_j)\} \subseteq I \times I.$$

FIG. 1 shows an example of inconsistent $x_1$ and $x_2$, for which the line connecting them in $\mathbb{R}^m$ (dashed line) is shorter than the geodesic $g_C(x_1, x_2)$ (dotted curve).

In the TCIE algorithm, we find a subset $\overline{P} \subset P$ of pairs of points that will be consistently used in the $\overline{MDS}$ problem. The algorithm goes as follows:

1 Compute the $N \times N$ matrix of geodesic distances $\Delta = (\delta_{ij})$.

2 Detect the boundary points $\partial \mathcal{M}$ of the data manifold

3 Detect a subset of consistent distances according to the following criterion, $$\overline{P}_1 = \{(i, j): c(z_i, z_j) \cap \partial \mathcal{M} = \emptyset\}, \quad (1.1)$$

or $$\overline{P}_2 = \{(i, j): \delta(z_i, z_j) \leq \delta(z_j, \partial \mathcal{M}) + \delta(z_i, \partial \mathcal{M})\}. \quad (1.2)$$

where $\delta(z, \partial \mathcal{M}) =$ $\inf_{z' \in \partial \mathcal{M}} \delta(z, z')$ denotes the distance from $z$ to the boundary.

4 Solve the MDS problem for consistent pairs only, $$X^* = \underset{X \in R^{N \times m}}{\operatorname{argmin}} \sum_{(i,j) \in \overline{P}} (d_{ij}(X) - \delta_{ij})^2.$$

We now describe the main stages of the algorithm:

Detection of Boundary Points

Step 2 in the TCIE algorithm of the invention is the detection of boundary points. There exist many algorithms that detect boundaries in point clouds, see e.g. [G. Guy and G. Medioni. Inference of surfaces, 3D curves, and junctions from sparse, noisy, 3D data. IEEE Transactions on Pattern Analysis and Machine Intelligence, 19(11):1265-1277, November 1997; T. E. Boult and J. R. Kender. Visual surface reconstruction using sparse depth data. In Computer Vision and Pattern Recognition, volume 86, pages 68-76, 1986]. For two-dimensional manifolds, we use the following heuristic that worked well even for relatively sparsely sampled manifolds. Essentially, the method of the invention assumes the point i and its two opposite neighbors, j, k, to be a part of a curve along the boundary. It then tries to find points that are placed outside of this boundary on both sides of it, violating the conjecture. This idea can be extended for m>2 as well, in the following way:

1 for $i = 1, \ldots, N$ do

2 Find the set $\mathcal{N}(i)$ of the $K$ nearest neighbors of the point $i$.

3 Apply MDS to the $K \times K$ matrix $\Delta_K =$ $(\delta_{kl \in \mathcal{N}(i)})$ and obtain a set of local coordinates $x'_1, \ldots, x'_K \in \mathbb{R}^m$.

4 for $j, k \in \mathcal{N}(i)$ such that $\frac{(x'_j - x'_i, x'_k - x'_i)}{\|x'_j - x'_i\| \cdot \|x'_k - x'_i\|} \approx -1$ do 5 Mark the pair $(j, k)$ as valid.

6 if $\left| x': \frac{(x' - x'_i, v_l)}{\|x' - x'_i\|} \approx 1 \right| \geq \tau_a |\mathcal{N}(i)|$ for all $l = 1, \ldots, m - 1$ then 7 Label the pair $(j, k)$ as satisfied. (here $v_l$ denotes the $l$th vector of an orthonormal basis of the subspace of $\mathbb{R}^m$ orthogonal to $x'_j - x'_k$).

8 end 9 end 10 if the ratio of satisfied to valid pairs is smaller than threshold$_{t_b}$ then 11 Label point $i$ as boundary.

12 end 13 end

The second method assumes an isotropic distribution of points in the neighborhood reconstructed by MDS and seems to work well in practice for three-dimensional manifolds. Directions in this method are selected according to neighboring points, avoiding the need to artificially determine the normal direction. Besides the proposed heuristics, other boundary detection algorithms can be used [P. Mordohai and G. Medioni. Unsupervised dimensionality estimation and manifold learning in high-dimensional spaces by tensor voting. In Proceedings of International Joint Conference on Artificial Intelligence, pages 798-803, 2005; D. Freedman. Ecient simplicial reconstructions of manifolds from their samples. IEEE Transactions on Pattern Analysis and Machine Intelligence, 24(10):1349-1357, October 2002]. In practice, if the intrinsic dimension of the manifold is large, many samples are required for boundary detection.

Detection of Inconsistent Geodesics

The first consistency criterion requires to check whether geodesics touch the boundary. Once we have detected the boundary points, we use a modification of the Dijkstra algorithm [T. H. Cormen, C. E. Leiserson, and R. L. Rivest. Introduction to Algorithms. MIT Press and McGraw-Hill, 1990; E. W. Dijkstra. A note on two problems in connection with graphs. Numerische Mathematik, 1:269-271, 1959], in the following manner: While extending the shortest path from source i to point j, towards point j's neighbors: For each neighbor k of point j, check if the currently known shortest path from i to point k is longer than the route through j. If so, 1 for $i = 1, \ldots, N$ do 2 Find the set $\mathcal{N}(i)$ of the $K$ nearest neighbors of the point $i$.

3 Apply MDS to the $K \times K$ matrix $\Delta_K =$ $(\delta_{kl \in \mathcal{N}(i)})$ and obtain a set of local coordinates $x'_1, \ldots, x'_K \in \mathbb{R}^m$.

-continued 4 for $j = 1, \ldots, K$ do 5 if $\dfrac{|\{x \in \mathbb{R}^m : (x'_i - x'_j, x - x'_i) > 0\}|}{|\{x \in \mathbb{R}^m : (x'_i - x'_j, x - x'_i) \leq 0\}|} \leq \tau_a$ then 6 mark $j$ as candidate.

7 end 8 end 9 end 10 if the number of candidate points is larger than$_{\tau_b}$ then 11 Label point $i$ as boundary.

12 end update the path length to the shorter path, as is done in the Dijkstra algorithm, but in addition, mark the newly updated path as an inconsistent if either (i) the path from i to j is a path marked to be removed, or (ii) j is a boundary point, and the path from i to k through j travels through more than one point. The second condition protects paths with a boundary end point from being removed. This way we eliminate only geodesics that do not end at the boundary but rather touch it and continue their journey. Removal is done after the path length calculation by assigning zero weight to the measured distance. Similar modifications can be made to the Bellman-Ford and Floyd algorithms, or other algorithms [R. Kimmel and J. A. Sethian. Computing geodesic paths on manifolds. Proceedings of the National Academy of Sciences, 95(15): 8431-8435, July 1998]. We note that for the second criterion, detection of inconsistent geodesic is trivially done by looking at the geodesic distances.

SMACOF Algorithm

Scaling by Majorizing a Complicated Function (SMACOF) is an iterative algorithm to find an optimal Configuration. SMACOF enables a way to include only consistent point pairs is to use weighted stress, $$X^* = \underset{X}{\mathrm{argmin}} \sum_{i=0, i<j} w_{ij}(d_{ij}(X) - \delta_{ij})^2,$$

where $w_{ij}=1$ if $(i,j) \in \overline{P}$. $\overline{P}$ can be set according to either the first criterion or the second criterion, and $w_{ij}=0$ otherwise. This allows us, by choosing the right weights, to minimize the error only for consistent geodesics.

The geodesics that were not marked as inconsistent during the Dijkstra algorithm have their weight set to one. We also allow a positive weight for short geodesics, in order to keep the connectivity of the manifold as a graph, even at boundary points. All other geodesics have their weight set to zero. We then use the SMACOF algorithm [I. Borg and P. Groenen. Modern multidimensional scaling: Theory and applications. Springer Verlag, New York, 1997. xviii+471 pp] to minimize the weighted stress.

We note that the correctness of these conditions depends on the assumption that our manifold is isometric to a sub-region of an Euclidean space, similarly to the underlying assumption of Isomap.

3.1 Theoretical Analysis

In this section we discuss a continuous case, in which the manifold is sampled with non-zero density. We assume the same assumptions on sampling density and uniformity made by Bernstein et al. [M. Bernstein, V. de Silva, J. C. Langford, and J. B. Tenenbaum. Graph approximations to geodesics on embedded manifolds. Technical report, Stanford University, January 2001], who proved the convergence of the graph distances approximation, used by the Isomap algorithm, to the geodesic distances on the manifold. Also note that the requirement of a positive density function prevents problems that may occur in geodesics approximated by a graph when the surface is sampled in a specific regular pattern. In our case, there is also the question of whether or not we remove too many geodesics. The answer is related to the topology of the manifold.

In the continuous case, our algorithm approximates an isometry between $\mathcal{C}$ with the geodesic metric $\delta$ and $\mathcal{M} \subset \mathbb{R}^m$ with the induced metric $d_C$. Our criteria always select consistent distances, as shown in the following propositions:

$$\overline{P}_1 = \{(i,j) : c(z_i, z_j) \cap \partial \mathcal{M} = \emptyset\} \subseteq P. \qquad \text{Proposition 1}$$

Proof. Let $(i,j) \in \overline{P}_1$. To prove the proposition, it is sufficient to show that the pair of points $(I, j)$ is consistent, i.e., $(I, j) \in P$. Let $c_{\mathcal{M}}(Z_1, Z_2)$ be the geodesic connecting $Z_i$ and $Z_j$ in $\mathcal{M}$ and let $c_C(x_1, x_2)$ be its image under $\phi^{-1}$ in C. Since $c(z_i, z_j) \cap \partial \mathcal{M} = \emptyset$ and because of the isometry, $c_C(x_i, x_j) \subset \text{int}(C)$. Assume that $(I, j)$ is inconsistent. This implies that $d_C(x_i, x_j) > d_{R^m}(x_i, x_j)$, i.e., that the geodesic $c_C(x_i, x_j)$ is not a straight line. Therefore, there exists a point x $c_C(x_i, x_j)$, in whose proximity $c_C(x_i, x_j)$ is not a straight line. Since $c_C(x_i, x_j) \subset \text{int}(C)$, there exists a ball $B_\epsilon(x)$ with the Euclidean metric $d_{R^m}$ around x of radius $\epsilon > 0$. Let us take two points on the segment of the geodesic within the ball, $x', x'' \in c_C(x_i, x_j) \cap B_\epsilon(x)$. The geodesic $c_C(x', x'')$ coincides with the segment of $c_C(x_i, x_j)$ between $x', x''$. Yet, this segment is not a straight line, therefore we can shorten the geodesic by replacing this segment with $c_{\mathbb{R}^m}(x', x'')$, in contradiction to the fact that $c_C(x_i, x_j)$ is a geodesic. Therefore, $(I, j) \in P$.

Therefore, for every geodesic in $\mathcal{M}$ which was not detected as touching the boundary, the image under $\phi^{-1}$ n is a line, which is approximated correctly by the MDS procedure. In the more general case, where $(\mathcal{M}, d_{\mathcal{M}})$ is not isometric to a sub-region of Euclidean space, the second criterion we have presented ensures that if the manifold is isometric to a sub-region C of a space $\mathcal{C}'$ with Riemannian metric, we only use geodesics for which the induced and the restricted metric identify.

Assume we have a pair of points for which the induced and the restricted metric on C are not the same. Therefore, the geodesic in $\mathcal{C}'$ must cross the boundary of C, resulting in the inequality $$d_C(x_1, x_2) > d_C(x_1, \partial \mathcal{C}) + d_C(x_2, \partial \mathcal{C}).$$

Using the second criterion, replacing the right hand side we have $$d_C(x_1, x_2) > d_C(x_1, x_2).$$

Resulting in a contradiction to the definition of induced metric. Note that for a parameterization manifold $\mathcal{C}'$ with an arbitrary Riemannian metric, the MDS procedure would not be able to give us the correct mapping. This would require the use of another procedure, as is done in [A. M. Bronstein, M. M. Bronstein, and R. Kimmel. Generalized multidimensional scaling: a framework for isometry-invariant partial surface matching. Proceedings of the National Academy of Sciences, 103(5):1168-1172, January 2006]. The second criterion may be of use in cases where the metric on $\mathcal{C}'$ is close to Euclidean, and yet we only want to use geodesics which stay in C.

3.2 Complexity Analysis

The algorithm involves several computationally demanding procedures,

Boundary detection—$O(N^2)$

Distance computation—$O(N^2 \log N)$

Stress minimization—$O(N^2)$ per iteration. While the number of SMACOF iterations is not invariant to the number of samples, in practice it rises slowly, depending on the topology of the manifold and the noise level.

4 Implementation Considerations

For determining the shortest paths we used the Dijkstra algorithm implementation supplied by Tenenbaum, et. al. [J. B. Tenenbaum, V. de Silva, and J. C. Langford. A global geometric framework for nonlinear dimensionality reduction. Science, 290(5500):2319-2323, December 2000], for the Isomap code. We added the detection of geodesics touching boundary points. The rest of the algorithm was implemented in MATLAB. In practice, the Dijkstra algorithm takes less than 10% of the total running time for 2000 points. Solving the MDS optimization problem consumes most of the time.

4.1 Numerical Properties and Convergence

Figure 2:
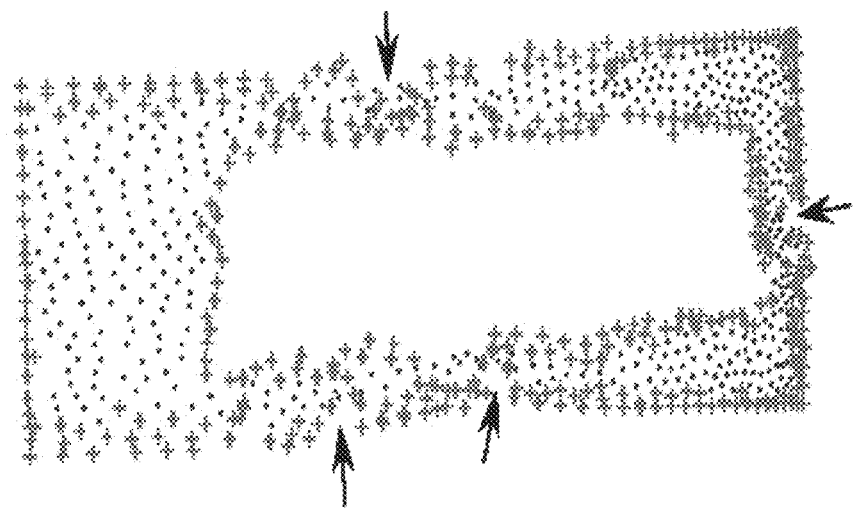
FIG. 2 is an example of a local minimizer of the weighted MDS problem. Ripples along the boundaries of the rectangle are marked with arrows.

The optimization problem solved is a non-convex one, and as such is liable to local convergence if convex optimization methods are employed [M. Trosset and R. Mathar. On the existence of nonglobal minimizers of the stress criterion for metric multidimensional scaling. American Statistical Association: Proceedings Statistical Computing Section, pages 158-162, November 1997]. In our experiments, we have seen that removing more distances from the stress function caused the problem to be more sensitive to local minima. An example of one such local minimum, encountered when flattening the Swiss-role with a hole example, is shown in FIG. 2. FIG. 2 is an example of a local minimizer of the weighted MDS problem. Ripples along the boundaries of the rectangle are marked with arrows. It appears as a fold over, or "flip". In general, the number of remaining weights depends on the surface topology, as well as the number of sampled points in the surface. In our experiments W was typically contained between 6% to 18% nonzero weights.

We reduce the risk of convergence to a local minimum by starting from a classical scaling (as mentioned by Trosset et. al. [A. Kearsley, R. Tapia, and M. W. Trosset. The solution of the metric stress and sstress problems in multidimensional scaling using newton's method. Computational Statistics, 13(3):369-396, 1998]) or unweighted least squares scaling solution. This allows the algorithm to avoid some of the local minima. Although the solutions found by classical scaling and least square scaling may differ, under the assumption of correct distance approximation, the solutions are similar. Using the unweighted LS-MDS problem to avoid local minima, and then gradually changing the problem solved into the weighted one is in the flavor of graduated non-convexity [A. Blake and A. Zisserman. Visual Reconstruction. The MIT Press, London, England, 1987], although the problem remains non-convex.

4.2 Convergence Acceleration by Vector Extrapolation Methods

To speed up the convergence of the SMACOF iterations, we employ vector extrapolation methods, as described above. Specifically, we suggest to use the MPE or RRE methods. In addition we also use a multi-scale convergence, as described above.

5 Results

In general, when a higher degree of accuracy is needed, extrapolation methods tend to work better, since the iterations tend to better approximate a linear iteration scheme, as discussed above in treatment of Nonlinear Equations.

Figure 4A:
FIG. 4A shows a Swiss roll surface without noise.
Figure 4B:
FIGS. 4B and 4C show the Swiss roll surface contaminated by Gaussian noise, with σ=0.015 (FIG. 4B) and σ=0.05 (FIG. 4C), and the spiral surface. Detected boundary points are shown in red.
Figure 4C:
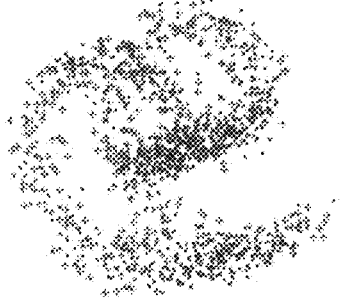

We tested our algorithm on the Swiss roll surface with a large rectangular hole, sampled at 1200 points. Flattening was performed for points sampled on the manifold with additive independently identically distributed Gaussian noise in each coordinate of each point. The various instances of the surface with noise are shown in FIG. 4. FIG. 4A shows a Swiss roll surface without noise, FIGS. 4B and 4C show the Swiss roll surface contaminated by Gaussian noise, with $\sigma$=0.015 (FIG. 4B) and $\sigma$=0.05 (FIG. 4C), and the spiral surface. Detected boundary points are shown in red. We compare the proposed algorithm to Isomap, LLE, Laplacian eigenmaps, diffusion maps and Hessian LLE, as shown in FIGS. 6-8.

Figure 5:
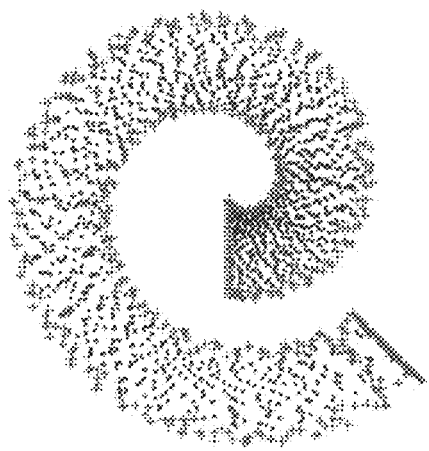
FIG. 5 shows a planar surface cut as a spiral. Detected boundary points are shown in red.

FIG. 5 shows a planar surface cut as a spiral. Detected boundary points are shown in red.

Figure 6A:
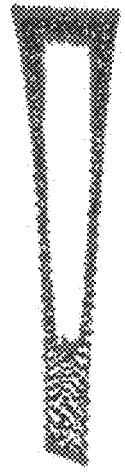
FIGS. 6A-F illustrate embedding of the Swiss roll of FIG. 4A (without noise).
Figure 6B:
Figure 6C:
Figure 6D:
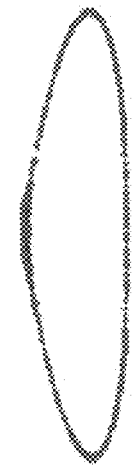
Figure 6E:
Figure 6F:

FIGS. 6A-F illustrate embedding of the Swiss roll of FIG. 4A (without noise). FIG. 6A shows the Swiss roll as produced by Locally Linear Embedding (LLE), FIG. 6B as produced by Laplacian eigenmaps, FIG. 6C as produced by Hessian LLE, FIG. 6D as produced by diffusion maps, FIG. 6E as produced by Isomap, FIG. 6F as produced by the TCIE algorithm of the invention. Detected boundary points are shown as red pluses.

Figure 7A:
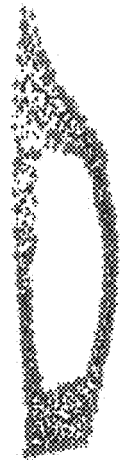
FIGS. 7A-F illustrate embedding of the Swiss roll of FIG. 4B (contaminated by Gaussian noise, with σ=0.015).
Figure 7B:
Figure 7C:
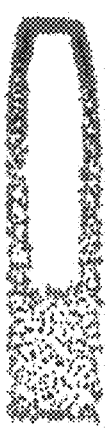
Figure 7D:
Figure 7E:
Figure 7F:

FIGS. 7A-F illustrate embedding of the Swiss roll of FIG. 4B (contaminated by Gaussian noise, with $\sigma$=0.015). FIG. 7A shows the Swiss roll as produced by LLE, FIG. 7B as produced by Laplacian eigenmaps, FIG. 7C as produced by Hessian LLE, FIG. 7D as produced by diffusion maps, FIG. 7E as produced by Isomap, FIG. 7F as produced by the TCIE algorithm of the invention. Detected boundary points are shown as red pluses.

Figure 8A:
FIGS. 8A-F illustrate embedding of the Swiss roll of FIG. 4C (contaminated by Gaussian noise, with σ=0.05).
Figure 8B:
Figure 8C:
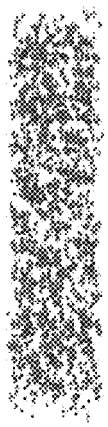
Figure 8D:
Figure 8E:
Figure 8F:

FIGS. 8A-F illustrate embedding of the Swiss roll of FIG. 4C (contaminated by Gaussian noise, with $\sigma$=0.05). FIG. 8A shows the Swiss roll as produced by LLE, FIG. 8B as produced by Laplacian eigenmaps, FIG. 8C as produced by Hessian LLE, FIG. 8D as produced by diffusion maps, FIG. 8E as produced by Isomap, FIG. 8F as produced by the TCIE algorithm of the invention. Detected boundary points are shown as red pluses.

We used the same number of neighboring points (12) in all algorithms, except for the diffusion maps algorithm, where we used value of the diffusion distance constant according to $$\sigma^2 = \frac{2}{N} \sum_{i=0}^{N} \min_j \|x_i - x_j\|^2.$$

This is the same rule used by Lafon ([S. Lafon. Di usion Maps and Geometric Harmonics. Ph.D. dissertation, Graduate School of Yale University, May 2004], page 33) up to a constant. The larger diffusion distance gave us more robust results. More specifically, the values of $\epsilon$ we used in the noiseless example and with $\sigma$=0.015, $\sigma$=0.05 were $3.897 \times 10^{-3}$, $3.998 \times 10^{-3}$ and $8.821 \times 10^{-3}$ respectively.

As for $\alpha$, the parameter used by Lafon et. al. [R. R. Coifman, S. Lafon, A. B. Lee, M. Maggioni, B. Nadler, F. Warner, and S. W. Zucker. Geometric diffusions as a tool for harmonic analysis and structure definition of data. Proceedings of the National Academy of Sciences, 102(21):7426-7431, May 2005] to specify various types of diffusion maps, we show here the results for $\alpha$=1, though other values of were also tested.

Our algorithm finds a representation of the manifold, with relatively small distortion. Adding i.i.d. Gaussian noise to the coordinates of the sampled points, our method remains accurate compared to other popular algorithms that exhibit large distortions. This can be seen, for example, for 1200 points, with σ=0.05, in FIG. 8, where for comparison, diam ($\mathcal{M}$)≈G.

tioned in a Gaussian distribution, $x_i$ N(0, 1), their distance matrix is computed, and the points configuration is then reconstructed using SMACOF. 50 point configurations were attempted for each parameters set. The average speed-up in CPU time comparing SMACOF iterations with and without RRE acceleration is shown in Table 7.

TABLE 7

The resulting speedup, in terms of the rate of decrease in residual norm, obtained using RRE with n = 5, k = 5

| Size (N) | σ = 0 | σ = $10^{-3}$ | σ = $10^{-2}$ | σ = $10^{-1}$ |
|---|---|---|---|---|
| N = 400 | 2.2642 ± 1.7209 | 1.6573 ± 0.9526 | 1.4870 ± 0.5303 | 1.5284 ± 0.2864 |
| N = 800 | 1.9447 ± 1.4139 | 1.9020 ± 0.9072 | 1.2429 ± 0.1552 | 1.5742 ± 0.3211 |
| N = 1200 | 1.9040 ± 1.2879 | 1.8419 ± 0.9321 | 1.4568 ± 0.3374 | 1.4823 ± 0.4370 |
| N = 1600 | 1.6292 ± 0.8268 | 1.6577 ± 0.6187 | 1.5950 ± 0.4348 | 1.3912 ± 0.2109 |

The algorithm was allowed to converge until the relative change in the weighted stress was below some threshold. Tests with higher noise levels were also performed and the performance boosting due to the RRE method is quite consistent. Using multiscale further reduces the computational cost of the solution, by a factor of 2, for the problem shown in the example. We note that the speedup depends on both the manifold topology and the problem size, among other factors, but such a reduction in computational effort is typical for all the problems we have tested.

We also tested our algorithm on a planar patch cut in the form of a spiral. Ideally, a correct solution can be achieved by linear methods such as PCA on the embedding space coordinates, and the large number of geodesics removed (only 6% of the geodesic distances remained) makes a worst case scenario for our algorithm. In practice, as FIG. 9 shows, the proposed algorithm introduces just a minor distortion whereas other algorithms fail to extract the structure of the manifold.

Figure 9A:
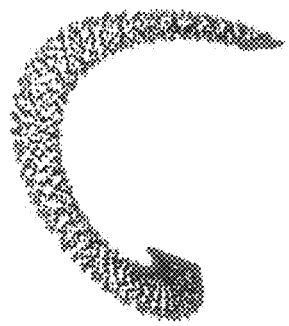
FIGS. 9A-F illustrate embedding of a 2D manifold in the shape of a flat spiral.
Figure 9B:
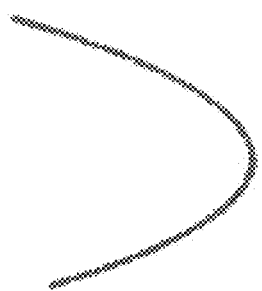
Figure 9C:
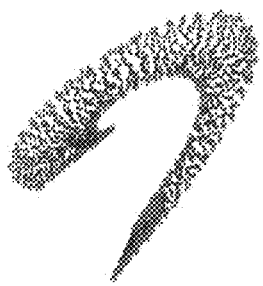
Figure 9D:
Figure 9E:
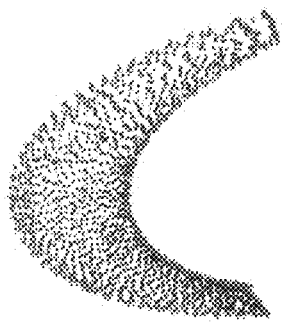
Figure 9F:
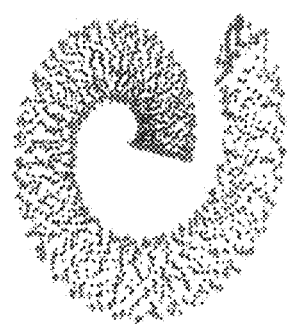

FIGS. 9A-F illustrate embedding of a 2D manifold in the shape of a flat spiral. FIG. 9A illustrates the embedding as produced by LLE, FIG. 9B as produced by Laplacian eigenmaps, FIG. 9C as produced by Hessian LLE, FIG. 9D as produced by diffusion maps, FIG. 9E as produced by Isomap, FIG. 9F as produced by the TCIE algorithm of the invention. Detected boundary points are shown as red pluses.

Figure 10:
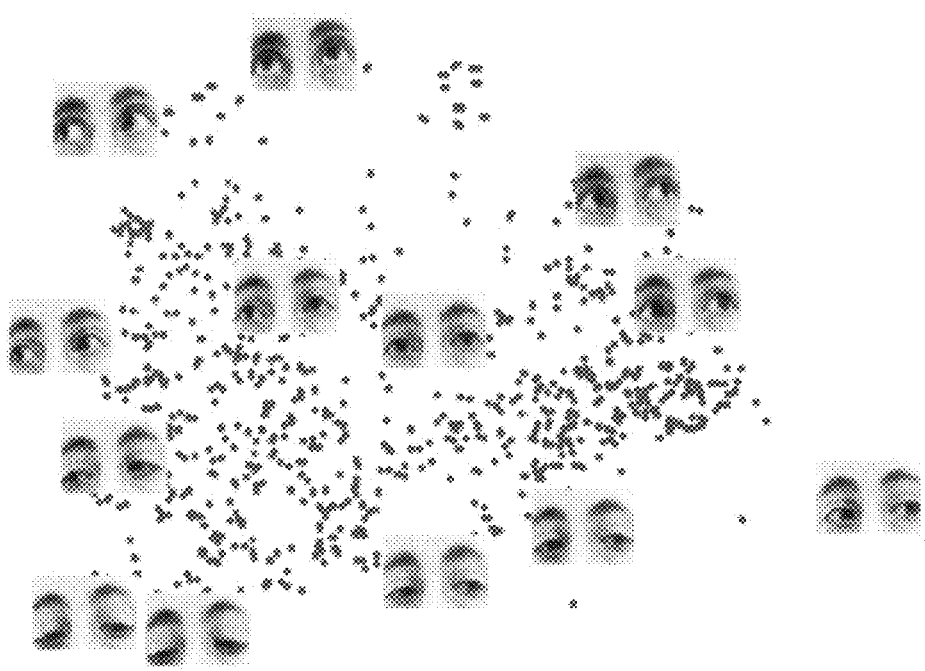
FIG. 10 shows the intrinsic coordinates of the image manifold of the eyes area with different gaze directions, as mapped by the TCIE algorithm of the invention.

Although in practical cases the data manifold is not necessarily isometric to a sub-region of a low-dimensional Euclidean space, our algorithm appears to be able to produce meaningful results in image analysis applications. FIG. 10 demonstrates the recovery of gaze direction of a person from a sequence of gray-scale images. FIG. 10 shows the intrinsic coordinates of the image manifold of the eyes area with different gaze directions, as mapped by the TCIE algorithm of the invention. Assuming that facial pose and expressions do not change significantly, images of the area of the eyes form a manifold approximately parameterized by the direction of the gaze. Similar to previous image manifold experiments [J. B. Tenenbaum, V. de Silva, and J. C. Langford. A global geometric framework for nonlinear dimensionality reduction. Science, 290(5500):2319-2323, December 2000], we use Euclidean distances between the row-stacked images as the distance measure. In order to reduce the effect of head movement, simple block matching was used.

5.1 Positioning of Random Points

As an example we first try to use MDS to reconstruct a random configuration of points set in $\mathbb{R}^3$, based on their Euclidean distances. Gaussian noise with different variance levels is added to the distance matrix. The points were posi- 5.2 A Euclidean Dimensionality Reduction Example In this example, previously shown by (Alex M. Bronstein, Michael M. Bronstein, and Ron Kimmel. Three-dimensional face recognition. International Journal of Computer Vision, 64(1):5-30, August 2005), the degree of the embedding space is much smaller than that of the original space used to generate the distances between points. For example, the points originally reside in $\mathbb{R}^{500}$. The points are comprised of two sets, distributed according to $$x_i = \text{sign}(N(\pm 0.75, 1))$$

where $$\text{sign}(x) = \begin{cases} +1 & x > 0 \\ -1 & x \le 0 \end{cases}$$

The speedup obtained compared to SMACOF, in terms of CPU time, is shown in Table 8

TABLE 8

The resulting speedup, in terms of CPU time, obtained using RRE with n = 8, k = 10, for the 2-classes Euclidean dimensionality reduction problem

| Size (N) | Speedup, CPU Time |
|---|---|
| N = 512 | 1.6129 ± 0.1041 |
| N = 768 | 1.6587 ± 0.0973 |
| N = 1024 | 1.5416 ± 0.1418 |
| N = 1536 | 1.4781 ± 0.0782 |
| N = 2048 | 1.4939 ± 0.0915 |

5.3 Graph Visualization Using Accelerated MDS

Figure 11:
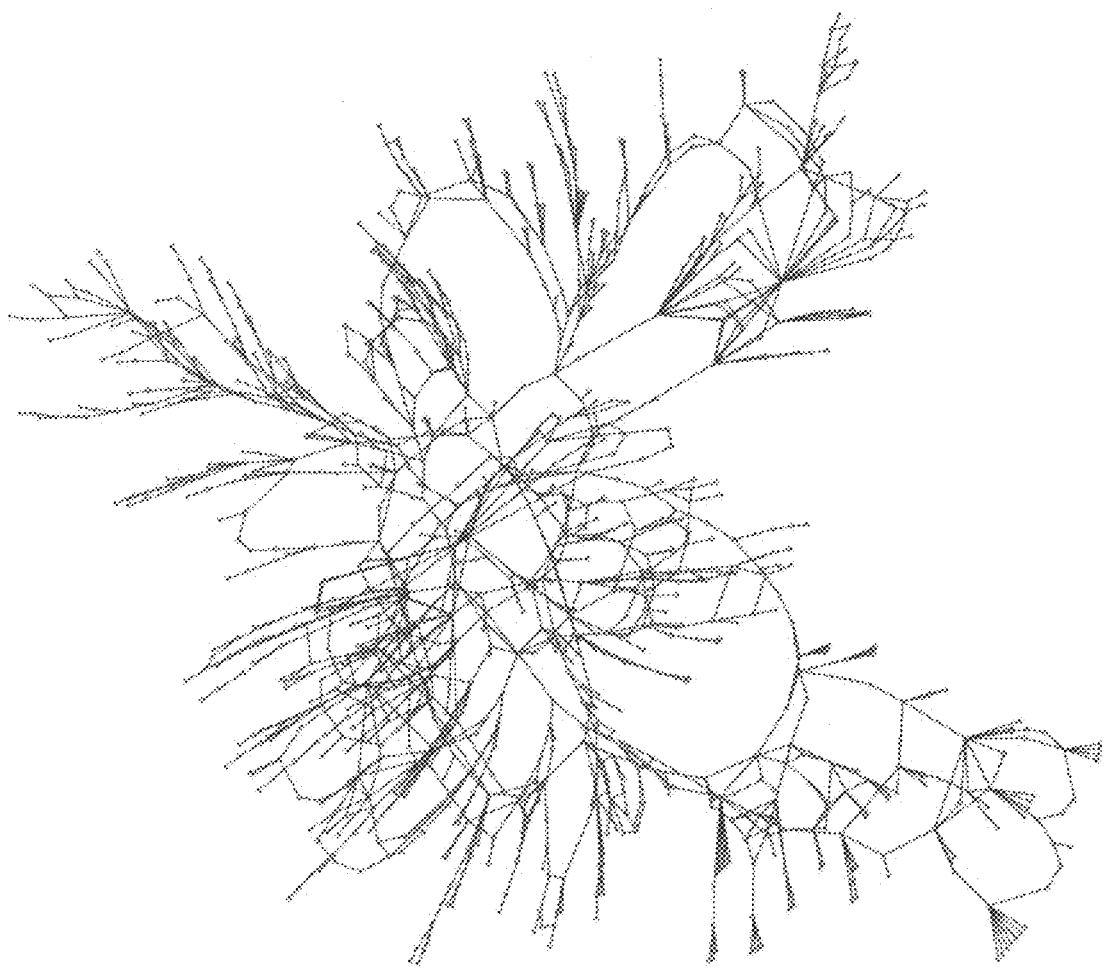
FIG. 11 shows the visual results using SMACOF and RRE-accelerated SMACOF, obtained for the 1138Bus graph distances matrix, taken from the Matrix Market repository.

We demonstrate the use of RRE-accelerated MDS on the 1138Bus graph distances matrix, taken from the Matrix Market repository (Ronald F. Boisvert, Roldan Pozo, Karin Remington, Richard Barrett, and Jack J. Dongarra. The Matrix Market: A web resource for test matrix collections. In Ronald F. Boisvert, editor, Quality of Numerical Software, Assessment and Enhancement, pages 125-137, London, 1997. Chapman Hall), and shown in FIG. 11 as an example for graph visualization based on MDS (Emden R. Gansner, Yehuda Koren, and Stephen C. North. Graph drawing by stress majorization. In J'anos Pach, editor, Graph Drawing, volume 3383 of Lecture Notes in Computer Science, pages 239-250. Springer, 2004). The resulting speed-up values are shown, for various n and k parameters in Table 9.

TABLE 9

The resulting speed-up, in terms of CPU time, obtained using RRE for the 1138Bus graph, using various n and k parameters

|       | k = 6         | k = 8          | k = 10        | k = 12        |
|-------|---------------|----------------|---------------|---------------|
| n = 1 | 1.148 ± 0.147 | 1.212 ± 0.1746 | 1.234 ± 0.123 | 1.218 ± 0.126 |
| n = 3 | 1.303 ± 0.186 | 1.267 ± 0.149  | 1.250 ± 0.135 | 1.212 ± 0.119 |
| n = 5 | 1.392 ± 0.167 | 1.320 ± 0.146  | 1.238 ± 0.154 | 1.211 ± 0.097 |

5.4 Isometry Invariant Canonical Forms

Another application of MDS we exemplify here is the representation of non-rigid shapes invariant to deformations. This method, referred to as canonical forms was proposed in (Asi Elad and Ron Kimmel. On bending invariant signatures for surfaces. IEEE Trans. Pattern Anal. Mach. Intell., 25(10): 1285-1295, 2003). In this application, MDS is used to map the intrinsic geometry of the shape (captured by the matrix of pairwise geodesic distances) into a Euclidean space. This produces a representation invariant to isometric deformations of the surface, and which can be treated as a rigid shape.

Figure 12A:
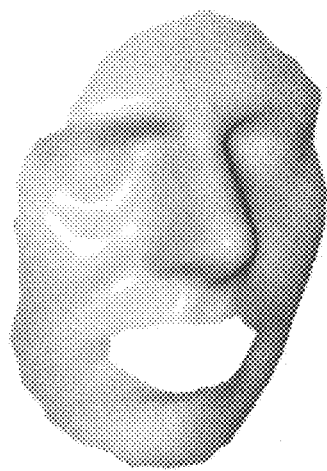
Figure 12B:
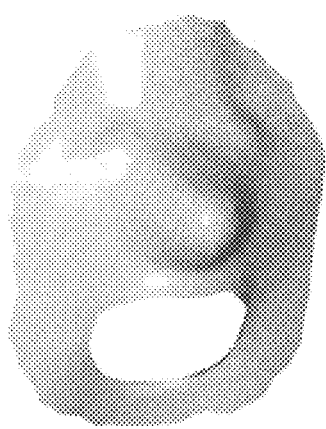
FIG. 12B shows the resulting canonical form.
Figure 13A:
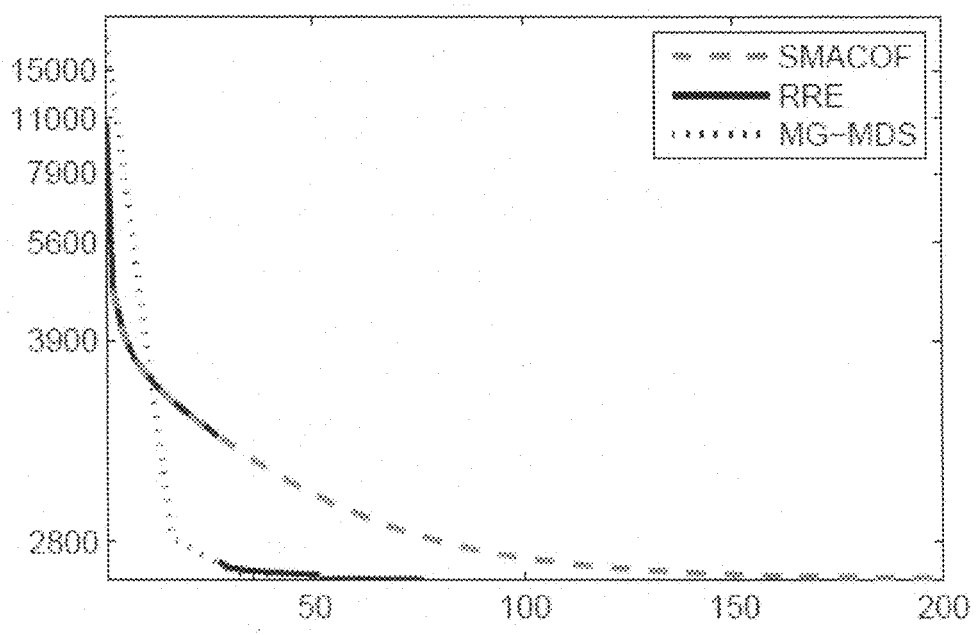
FIGS. 13A, 13B show diagrams depicting stress, as a function of CPU time for the canonical forms problem. CPU time is approximated.
Figure 13B:
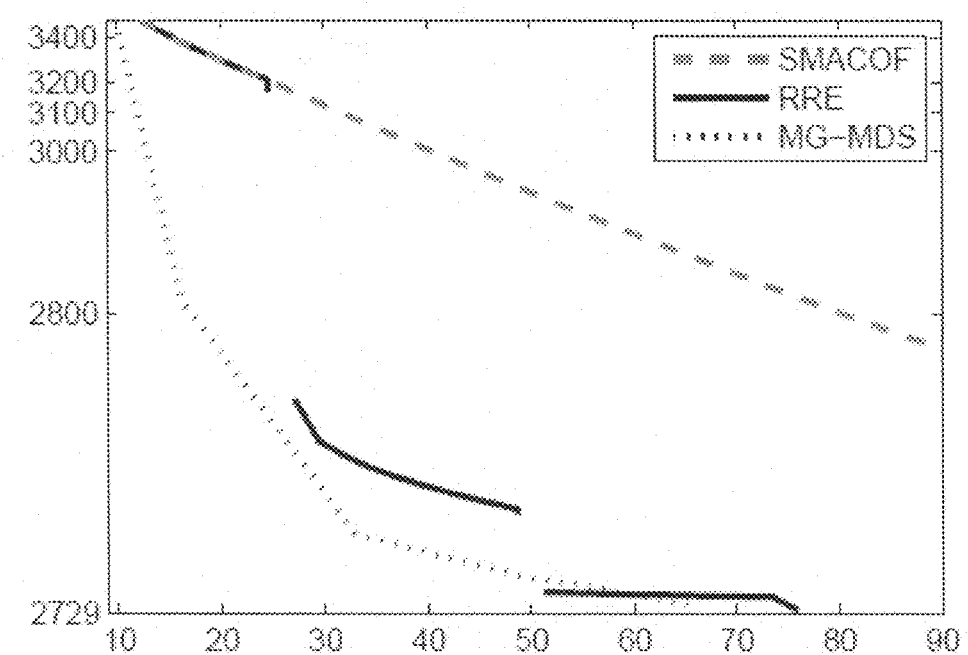

The canonical forms method was used in the problem of face recognition by (Alex M. Bronstein, Michael M. Bronstein, and Ron Kimmel. Three-dimensional face recognition. International Journal of Computer Vision, 64(1):5-30, August 2005). An example of a facial surface and its canonical form is shown in FIG. 12. In order to compare our work to existing acceleration techniques for SMACOF, we show in FIGS. 13A, 13B the resulting stress values, as a function of CPU time, when using RRE and multigrid (Michael M. Bronstein, Alex M. Bronstein, R. Kimmel, and I. Yavneh. Multigrid multidimensional scaling. Numerical Linear Algebra with Applications, Special issue on multigrid methods, 13(2-3): 149-171, March-April 2006) to accelerate the computation of canonical forms.

Both the RRE and the multigrid methods seem to accelerate MDS significantly for the canonical forms problem, by a factor 4-5 for the specific example at hand. In practice, the speedup gained may vary significantly, based on the problem.

5.5 TCIE Using Accelerated MDS

We now demonstrate the use of accelerated MDS in a nonlinear dimensionality reduction (NLDR) application, as part of the topologically constrained isometric embedding (TCIE) algorithm (Guy Rosman, Alex M. Bronstein, Michael M. Bronstein, and Ron Kimmel. Topologically constrained isometric embedding. In Proc. Conf. on Machine Learning and Pattern Recognition (MLPR), 2006). Nonlinear dimensionality reduction techniques [Eric. L. Schwartz, Alan Shaw, and Estarose Wolfson. A numerical solution to the generalized mapmaker's problem: Flattening nonconvex polyhedral surfaces. IEEE Trans. Pattern Anal. Mach. Intell., 11:1005-1008, November 1989; Joshua B. Tenenbaum, Vin de Silva, and John C. Langford. A global geometric framework for nonlinear dimensionality reduction. Science, 290(5500): 2319-2323, December 2000; Sam T. Roweis and Lawrence K. Saul. Nonlinear dimensionality reduction by locally linear embedding. Science, 290:2323-2326, 2000; Mikhail Belkin and Partha Niyogi. Laplacian eigenmaps and spectral techniques for embedding and clustering. In T. G. Dietterich, S. Becker, and Z. Ghahramani, editors, Advances in Neural Inf. Proc. Sys., volume 14, pages 585-591, Cambridge, Mass., 2002. MIT Press; Kilian Q. Weinberger and Laurence K. Saul. Unsupervised learning of image manifolds by semidefinite programming. In Proceedings of the IEEE Conference on Computer Vision and Pattern Recognition, volume 2, pages 988-995, Washington D.C., 2004. IEEE Computer Society; Ronald R. Coifman, Stephane Lafon, Ann B. Lee, Mauro Maggioni, Boaz Nadler, Frederick Warner, and Steven W. Zucker. Geometric diffusions as a tool for harmonic analysis and structure definition of data. Proc. Natl. Acad. Sci. USA, 102(21):7426-7431, May 2005] attempt to describe a given high-dimensional data set of points as a low dimensional manifold, by a nonlinear map preserving certain properties of the data.

These techniques have applications in several fields, such as color perception, pathology tissue analysis (Ronald R. Coifman, Stephane Lafon, Ann B. Lee, Mauro Maggioni, Boaz Nadler, Frederick Warner, and Steven W. Zucker. Geometric diffusions as a tool for harmonic analysis and structure definition of data. Proc. Natl. Acad. Sci. USA, 102(21):7426-7431, May 2005), motion understanding (Robert Pless. Using Isomap to explore video sequences. In Proceedings of the 9th International Conference on Computer Vision, pages 1433-1440, Nice, France, October 2003), enhancement of MRI images (Roberto Moreno Diaz and Alexis Quesada Arencibia, editors. Coloring of DT-MRI Fiber Traces using Laplacian Eigenmaps, Las Palmas de Gran Canaria, Spain, Feb. 24-28, 2003. Springer Verlag), face recognition (Alex M. Bronstein, Michael M. Bronstein, and Ron Kimmel. Three-dimensional face recognition. International Journal of Computer Vision, 64(1):5-30, August 2005), and biochemistry (Yosi Keller, Stephane Lafon, and Michael Krauthammer. Protein cluster analysis via directed diffusion. In The fifth Georgia Tech International Conference on Bioinformatics, November 2005; Payel Das, Mark Mol, Hernan Stamati, Lydia E. Kavraki, and Cecilia Clementi. Low-dimensional, free-energy landscapes of protein-folding reactions by nonlineardimensionality reduction. Proc. Natl. Acad. Sci. USA, 103(26):9885-9890, June 2006).

Figure 14A:
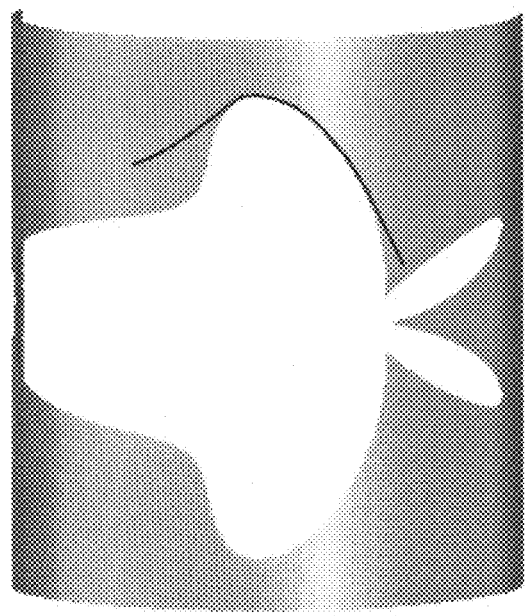
FIGS. 14A, 14B show an example of inconsistent $x_1$ and $x_2$, for which the line connecting them in $R^m$ (dashed line) is shorter than the geodesic connecting $x_1$ and $x_2$ (solid curve).
Figure 14B:
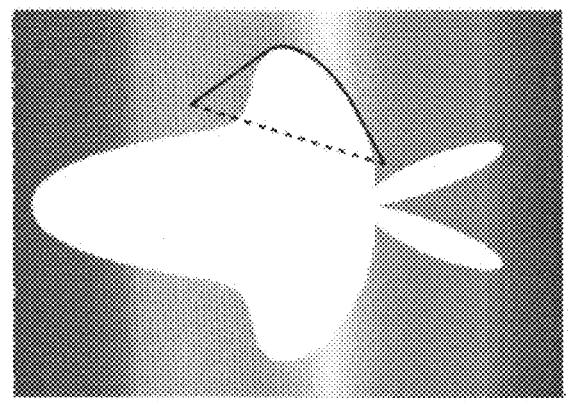

In the TCIE algorithm, a weighted MDS problem is solved, using distances obtained by using local Euclidean distances, and their extension by means of dynamic programming. This approximates the geodesics connecting points in the manifold the data is sampled from. The weights allow the algorithm to avoid approximating geodesics which should not map to a straight line in the new representation (Guy Rosman, Alex M. Bronstein, Michael M. Bronstein, and Ron Kimmel. Topologically constrained isometric embedding. In Proc. Conf. on Machine Learning and Pattern Recognition (MLPR), 2006). Such geodesics, and their end point pairs, are called inconsistent. An example of such a mapping and an inconsistent point pair is shown in FIGS. 14A, 14B.

Figure 15A:
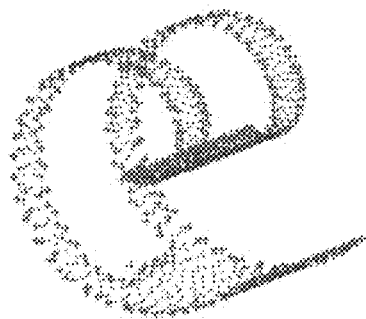
FIG. 15A shows a Swiss roll surface with a hole in it. Detected boundary points are shown in red.
Figure 15B:
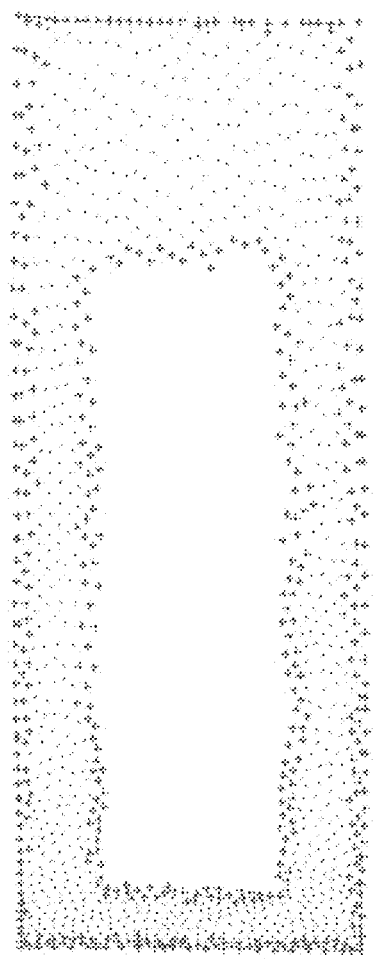
FIG. 15B shows the mapping obtained using the TCIE algorithm.
Figure 16A:
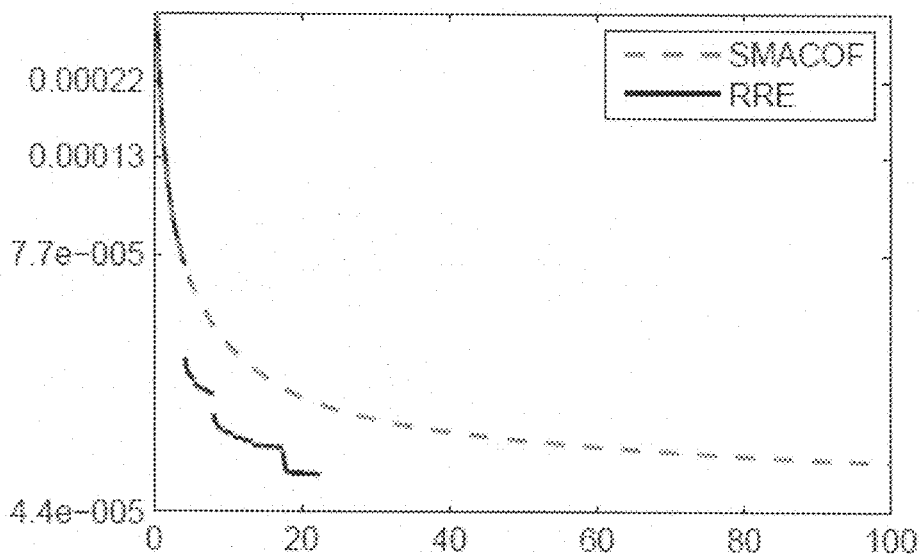
FIGS. 16A, 16B are diagrams showing convergence (in terms of stress value) of basic SMACOF (FIG. 16A, dashed gray), SMACOF with RRE (FIG. 16A, black), SMACOF with multi resolution acceleration (FIG. 16A, dashed gray), and SMACOF with both RRE and multiscale (FIG. 16A, black), in terms of CPU time, as part of the TCIE algorithm. CPU time is approximated. Convergence at each scale was stopped at the same relative change of stress value.
Figure 16B:
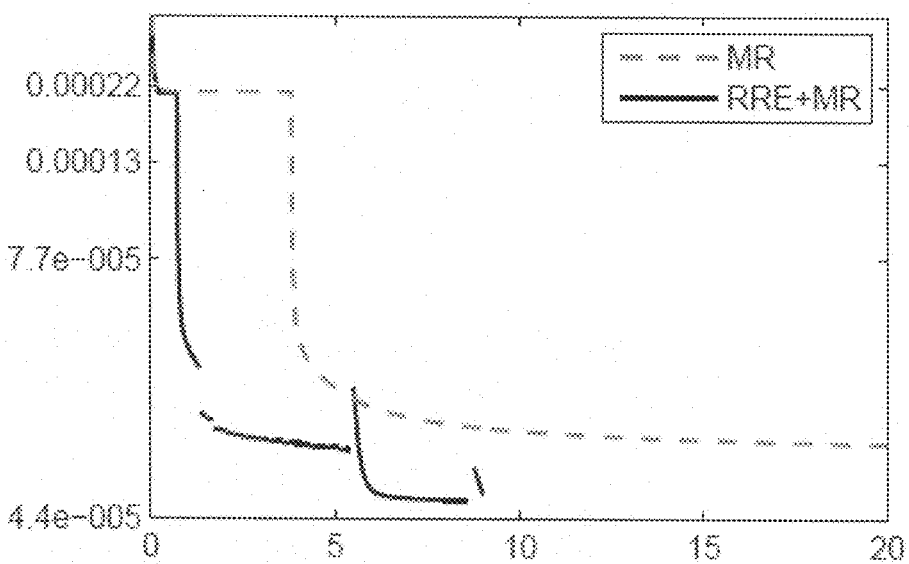

We have used RRE to accelerate the convergence of the MDS algorithm used in the TCIE algorithm (Guy Rosman, Alex M. Bronstein, Michael M. Bronstein, and Ron Kimmel. Topologically constrained isometric embedding. In Proc. Conf. on Machine Learning and Pattern Recognition (MLPR), 2006. We used a Swiss roll with a hole in it as an example. The original data, as well as the data after reduction to $R^2$ are shown in FIGS. 15A, 15B. The RRE accelerated MDS, combined with a multiscale optimization framework, to compute the coordinates which minimize the stress function. The resulting speedups, were at least 2-3 times compared to the ordinary SMACOF algorithm computed in a multiscale manner. A graph comparing the progress of the TCIE algorithm with and without using reduced rank extrapolation, and multiscale optimization is shown in FIGS. 16A, 16B.

Figure 17:
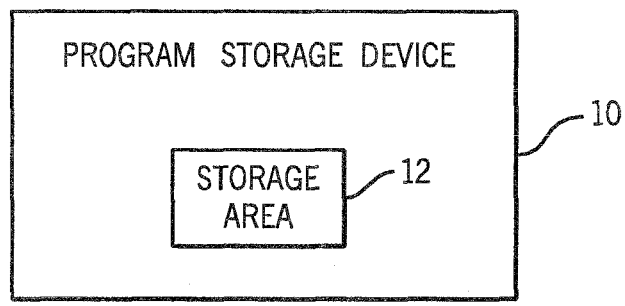
FIG. 17 is a schematic depiction of one embodiment.

In another aspect, the present invention relates to a program storage device 10 having a storage area 12, as shown in FIG. 17. Information stored in the storage area in a well-known manner that is readable by a machine, and that tangibly embodies a program of instructions executable by the machine for performing the method of the present invention described herein for multidimensional scaling of a data set. The program storage device can be a magnetically recordable medium device, such as a magnetic diskette or hard drive, or an optically recordable medium device, such as an optical disk. Alternatively, the storage area can be located separately from the program storage device and be connected remotely via wired or wireless means.

Using Accelerated MDS for Semi-Supervised Learning

Another possible application of MDS is to use it for semi-supervised learning. ("The Semi-Supervised Learning Book"/O. Chapelle, B. Schölkopf and A. Zien, MIT Press, 2006). The paradigm of semi-supervised learning tries to use various techniques to overcome the relatively high cost of obtaining classified example for machine learning in comparison to that of obtaining unclassified examples. This can be done by using dimensionality reduction methods to obtain a low-dimension representation of the data, and assuming that examples mapped closely together in the newly obtained space coordinates should be, on average, classified similarly. MDS and NLDR techniques such as TCIE lend themselves quite naturally to obtaining this low-dimensionality representation. Since the number of unclassified examples is often quite large, accelerating the MDS or NLDR computation should be quite useful.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A program storage device comprising:
a storage area; and
information stored in the storage area, the information being readable by a machine, and tangibly embodying a program of instructions executable by the machine for performing method steps for multidimensional scaling of a data set comprising a plurality of data elements, each data element identified by its coordinates, the method comprising the steps of:
(i) applying an iterative optimization technique a predetermined amount of times on a coordinates vector, said coordinates vector representing the coordinates of a plurality of said data elements, and obtaining a modified coordinates vector;
(ii) applying a vector extrapolation technique on said modified coordinates vector obtaining a further modified coordinates vector; and
(iii) repeating steps (i) and (ii) until one or more predefined condition are met.

2. A program storage device according to claim 1, wherein said iterative optimization procedure is carried on in a multi-scale manner.

3. A program storage device according to claim 1, wherein said iterative optimization technique is SMACOF.

4. A program storage device according to claim 1, wherein the cost function optimized for by the iterative optimization technique includes a stress cost function as a component, with or without the addition of other terms.

5. A program storage device according to claim 1, wherein said vector extrapolation technique is Minimal Polynomial Extrapolation or Reduced Rank Extrapolation.

6. A program storage device according to claim 1, wherein said one or more predefined conditions comprises:
(i) the norm of the change in the vector $\|x_{n+i+1}-x_{n+i}\|$ under some norm is smaller than a specified value;
(ii) the relative change in the cost function $$\frac{F_{cost}(x_{n+i}) - F_{cost}(x_{n+i+1})}{F_{cost}(x_{n+i+1})}$$

is smaller than a specified value;
(iii) a specified number of iterations/cycles has elapsed;
(iv) a certain amount of time has passed; or
(v) any combination thereof.

7. A program storage device according to claim 1, wherein said iterative optimization technique comprises:
(i) Gradient Descent algorithm with or without line search;
(ii) Conjugate Gradients algorithm with or without line search;
(iii) Quasi Newton algorithm with or without line search;
(iv) Newton algorithm with or without line search; or
(v) Levenberg-Marquardt algorithm with or without line search.

8. A program storage device according to claim 1, wherein the cost function associated with the iterative optimization technique comprises:
(i) the least squares cost function;
(ii) the SSTRESS cost function;
(iii) the STRAIN cost function;
(iv) a p-norm on the distortion of distances;
(v) any non-metric MDS cost function; or
(vi) any cost functional including a distance distortion term.

9. A program storage device according to claim 1, used in one or more of the following applications:
(i) visualization of abstract data;
(ii) generic machine learning and/or semi-supervised learning for pattern recognition;
(iii) image retrieval, using various image features as a basis for a dissimilarity;
(iv) geometric surfaces processing;
(v) identification of sampled objects;
(vi) pattern classification and data mining for large data sets;
(vii) data visualization for real-time data from network administration and/or supply networks and/or infrastructure; or
(viii) detecting trends and components of multidimensional data.

10. A program storage device according to claim 1, wherein said data set is reduced to two or three dimensions.

* * * * *